United States Patent [19]
Smith

[11] Patent Number: 5,457,694
[45] Date of Patent: Oct. 10, 1995

[54] METHOD AND APPARATUS FOR ANALYZING THE ATA (IDE) INTERFACE

[76] Inventor: Dale J. Smith, 612 Mindy Way, San Jose, Calif. 95123

[21] Appl. No.: 82,880

[22] Filed: Jun. 25, 1993

[51] Int. Cl.⁶ .............................. G06F 11/22; G06F 11/30
[52] U.S. Cl. .................. 371/20.1; 371/20.4; 395/185.09; 395/280
[58] Field of Search .................................... 395/325, 575; 371/20.1, 29.5, 20.4

[56] References Cited

U.S. PATENT DOCUMENTS

| | | | |
|---|---|---|---|
| 4,166,290 | 8/1979 | Furtman | 395/575 |
| 4,628,511 | 12/1986 | Stitzlein | 371/29.1 |
| 4,636,941 | 1/1987 | Suko | 395/575 |

OTHER PUBLICATIONS

Adaptec brochure–ATLA–310 ATA Buslogic Analyzer Published Jun. 1990.
Data Transit brochure–SCSI Analyzer Published Mar. 1991.

*Primary Examiner*—Jack B. Harvey
*Assistant Examiner*—Jeffrey K. Seto

[57] ABSTRACT

An analyzer which can record the events occuring on an ATA computer bus and provide an easily understandable, yet detailed description of those events to either a local user, or a remote user, for the purpose of diagnosing an ATA related problem or measuring performance. The analyzer is small and portable, simple to operate, and capable of transferring recorded data to almost any computer through an RS232 serial port. The invention has a memory system which stores the recorded signals or events, a trigger circuit used to select the starting and stopping point of the recording, an event recognition circuit which can limit the recording to certain events, and a processor which can interpret the data and display it to a user on the built-in displays, or on a printout, or on a local or remote terminal. Additionally, the ATA analyzer will search its recorded memory for an event specified by the user and display any occurance of that event.

4 Claims, 20 Drawing Sheets

FIGURE 7 - MICROCONTROLLER

FIGURE 11 - COMMUNICATIONS

FIGURE 12 - KEYBOARD

FIGURE 15 — EVENT/EXTERNAL TRG

FIGURE 16 - DISPLAYS

FIGURE 17 - DISPLAYS

FIGURE 18 - DISPLAYS

FIGURE 19 - DISPLAYS

```
                           EXAMINE MENU
2101
2102     <M>enu ..... Prints the Capture Menu
         <F>orward .. View the Next Page
2103     <R>everse .. View the Previous Page
2104     <SPACE> .... View One Line at a time
2105     <Z>ero ..... Zero the Counter
2106     <S>earch ... Search for Pattern defined by Trigger
         <T>ransfer.. Continuous Transfer until Key Press
2107

<1> ....... Forward 100        <!> (Shift 1) .... Reverse 100
         <2> ....... Forward 200        <@> (Shift 2) .... Reverse 200
         <3> ....... Forward 300        <#> (Shift 3) .... Reverse 300
         <4> ....... Forward 400        <$> (Shift 4) .... Reverse 400
         <5> ....... Forward 500        <%> (Shift 5) .... Reverse 500
         <6> ....... Forward 600        <^> (Shift 6) .... Reverse 600
         <7> ....... Forward 700        <&> (Shift 7) .... Reverse 700
         <8> ....... Forward 800        <*> (Shift 8) .... Reverse 800
         <9> ....... Forward 900        <(> (Shift 9) .... Reverse 900
         <0> ....... Forward 1000       <)> (Shift 0) .... Reverse 1000

```
      2201    2203   2204  2205   2206      2207                   2208              2209
        \       \      \     \       \        \                      |                 |
      <M>enu <F>wd <R>ev <SPACE> <Z>ero <S>earch   |         HOST          |      DRIVE
                                                  |I  I D 1 3 A A A R | C R I D P D S
      EVENT#  EVENT/TASK  REG DATA  DESCRIPTION   |O  O M F F 2 1 0 S | 1 D R M D S Y
      ----------------------------------------------|R  W A X X       T | 6 Y Q R G P N
      + 00003  RD CYL LO   1F4  00                 |R    1   2         |   R I   P D
      + 00004  RD CYL HI   1F5  00                 |R    1   2   0     |   R I   P D
      + 00005  RD DRV/HEAD 1F6  A0                 |R    1   2 1       |   R I   P D
      + 00006  RD STATUS   1F7  51  RDY/DSC/ERR    |R    1   2 1 0     |   R I   P D
      + 00007  RD ALT STAT 3F6  51  RDY/DSC/ERR    |R      3 2 1       |   R I   P D
      + 00008  RD DRV ADDR 3F7  FE                 |R      3 2 1 0     |   R I   P D
      + 00009  RD STATUS   1F7  51  RDY/DSC/ERR    |R    1   2 1 0     |   R I   P D
      + 00010  RD STATUS   1F7  51  RDY/DSC/ERR    |R    1   2 1 0     |   R I   P D
      + 00011  WR FEATURES 1F1  68  UNKNOWN FEATURE|  W  1       0     |   R I   P D
      + 00012  WR SEC CNT  1F2  01                 |  W  1     1       |   R I   P D
      + 00013  WR SEC NUM  1F3  01                 |  W  1     1 0     |   R I   P D
      + 00014  WR CYL LO   1F4  00                 |  W  1   2         |   R I   P D
      + 00015  WR CYL HI   1F5  00                 |  W  1   2   0     |   R I   P D
      + 00016  WR DRV/HEAD 1F6  A0                 |  W  1   2 1       |   R I   P D
      + 00017  RD SEC CNT  1F2  01                 |R    1     1       |   R I   P D
      + 00018  WR COMMAND  1F7  21  READ W/O RETRY |  W  1   2 1 0     |   R I   P D
      + 00019  RD STATUS   1F7  D0  BSY/RDY/DSC    |R    1   2 1 0     |   R I   P D
      + 00020  RD STATUS   1F7  D0  BSY/RDY/DSC    |R    1   2 1 0     |   R I   P D
      + 00021  RD STATUS   1F7  D0  BSY/RDY/DSC    |R    1   2 1 0     |   R I   P D
```

FIG. 22

METHOD AND APPARATUS FOR ANALYZING THE ATA (IDE) INTERFACE

FIELD OF THE INVENTION

This invention relates generally to digital computer systems, particularly to the buses used for transferring data between a computer and a data storage system. More particularly, the invention is a bus analyzer for analyzing and troubleshooting the ATA (Advanced Technology Attachment, also called IDE for Integrated Drive Electronics) bus used commonly by personal computers to interlace to hard disk drives.

BACKGROUND OF THE INVENTION

In general, an ATA analyzer performs the tasks of troubleshooting, and performance measurement. There are numerous reasons why an ATA disk drive may not work with a computer which supports ATA disk drives. Because of the large number of disk drive manufacturers and personal computer manufacturers, compatibility problems are common. Other sources of problems include cable length, noise, or simply a broken computer or disk drive. An ATA analyzer makes it easier to troubleshoot compatibility problems and other problems that may prevent a computer from accessing its storage device. It makes troubleshooting easier by recording all of the signal changes on the ATA bus, or by selectively recording only the important events. The analyzer presents the recorded data to the user in a form which includes high level information such as "Read Command", and low level information such as "the IOR bit is set". An ATA analyzer also performs the function of identifying performance levels in areas such as access time, transfer rates, and command overhead by providing a time indicator which indicates how much time has passed between two bus events.

An ATA analyzer is similar to a general purpose logic analyzer by being able to record signals present on its inputs using either a state mode or a timing mode, by having a trigger to either start or stop the capture, and by being able to display the captured signals to the user. An advantage of an ATA analyzer over a general logic analyzer is that an ATA analyzer is much easier to setup and use, due to it's design for a specific purpose. Another advantage of an ATA analyzer over a standard logic analyzer is the ability to interpret the ATA bus signals for the user, so that even those who are unfamiliar with ATA bus operation can understand what events occurred, and identify the cause of a problem.

DISCUSSION OF PRIOR ART

Previous analyzers for the ATA bus consisted of a printed circuit board which plugged into the internal bus of a personal computer and relied on the personal computer to control all of the analyzers hardware and interpret the analyzers recorded data. An example of this type of ATA analyzer is the ATA Bus Logic Analyzer from Adaptec.

Drawbacks of the prior art plug-in card design are: 1) It required the user to purchase an entire MS-DOS compatible computer system in order to use it (MS-DOS, TM Microsoft Corporation); 2) The user had to be familiar with the MS-DOS operating system in order to use the analyzer; 3) Hardware and software configuration of the analyzer into the host computer was difficult, or impossible in cases where the computer resources required by the analyzer card were already allocated elsewhere; and 4) The size of the functional analyzer, which included the personal computer, was relatively large, which decreased portability. The primary advantage of a plug-in card was that it kept the manufacturing costs of the analyzer low by removing much of the hardware that was otherwise required. Unfortunately, the end user cost was high since an entire computer had to be purchased to run the analyzer.

The prior art required a high degree of user knowledge of ATA protocol.

Knowledge of how each ATA signal functions was required to set up a trigger point for the analyzer. The prior art required that the user select a condition of set, reset, or don't care, for every ATA signal in order for a trigger to be defined.

Knowledge of all of the ATA register bit definitions was required in order to interpret the recorded data. Interpreting the recorded data was difficult because the prior art did not tell the user the purpose of each recorded event, or the bit definitions of bits in the ATA registers.

An additional disadvantage of the prior an was that no accommodations were made for remote control of the ATA analyzer. Thus the person performing the diagnostics had to be at the location of the system under test.

Another limitation of the prior an was the method of capturing data on the ATA bus. The prior art sampled the bus, and stored any sample that was different than the previous stored sample. This method resulted in capturing mostly invalid events because the ATA bus is constantly changing the address and data signals. The ATA address and data signals are constantly changing as the computer system accesses its own internal memory. Internal memory accesses are ignored by an ATA device. Thus, the prior art filled its memory with mostly invalid events. These invalid events are stored in memory better used for valid events. The invalid events can only be distinguished from valid events by an expert in ATA protocol.

Another limitation of the prior art was the lack of a means for searching the recorded data for a particular event of interest.

SCSI bus analyzers have solved some of the problems with the prior ATA analyzers. A SCSI analyzer manufactured by Data Transit is a small, portable, complete, easy-to-use, remote-controlled SCSI bus analyzer. However, the state recording method used by a SCSI analyzer can not be used for the ATA bus.

Several patents discuss prior art bus analyzers.

The Furtman, et. al., U.S. Pat. No. 4,166,290 describes a computer channel monitor. The computer channel monitor is capable of performance measurement of a mainframe computer, but has limited use for troubleshooting. One disadvantage of the computer channel monitor is that it can not be used for recording all of the events occurring on the channel because it lacks a trigger for starting or stopping the capture. Another disadvantage is that it lacks the bandwidth to continuously record all of the events occurring on the channel. Thus it can only record the first events occurring on a channel, or a subset of the events occurring on a channel. These limitations make it unusable for ATA bus troubleshooting.

The Stitzlein at. al., U.S. Pat. No. 4,628,511 solves the triggering limitation of U.S. Pat. No. 4,166,290 using a Pin Matrix Panel for trigger selection and for capture event selection. A disadvantage of the Pin Matrix Panel is that it is impossible to remotely select the trigger. Another disadvantage of the Pin Matrix Panel is that it requires an expert user to operate the Pin Matrix Panel.

Most prior art analyzers mentioned above have the limitation of not being able to store the state of the bus within 10 nanoseconds of a strobe, as required by the ATA bus. However, the Adaptec ATA analyzer solved this problem by asynchronously sampling the bus every 40 nanoseconds to ensure that one of the samples caught the data when it was valid. A disadvantage of this sampling method is that it fills memory with mostly invalid data as described earlier.

OBJECTS AND ADVANTAGES

An object of the present invention is to eliminate the personal computer by integrating all functions of an ATA bus analyzer into a lower cost, self contained unit.

Another object of the invention is to eliminate the configuration and initialization required for prior art methods of an ATA bus analyzer.

Another object of the invention is to simplify the operation so that unskilled users can easily operate an ATA bus analyzer.

Another object of the invention is to enable a user to remotely diagnose problems on an ATA bus.

Another object of the invention is to more efficiently use memory and provide the storage of more events.

Another object of the invention is to avoid confusing the user by storing invalid events.

Another object of the invention is to provide a search feature such that a user can quickly search and view a desired event.

Further objects and advantages of my invention will become apparent from a consideration of the drawings and ensuing description.

SUMMARY OF THE INVENTION

The present invention is an ATA bus analyzer which can record the events occurring on an ATA computer bus. The invention provides an easily understandable, yet detailed description of events to either a local or a remote user, in order to diagnose an ATA related problem or measure performance. The ATA bus analyzer is small, portable, easy-to-use, and capable of transferring recorded data to most computers through an RS232 serial port. The invention has a memory system which stores the recorded signals or events. A trigger circuit is used to select the starting and stopping point of the recording. An event recognition circuit limits the recording to certain valid events. A processor interprets the data and shows the interpretation to a user on a built-in display, or paper printout, or local terminal, or remote terminal. Additionally, the ATA analyzer searches recorded memory for an event specified by the user and displays any occurrence of that event.

BRIEF DESCRIPTION OF THE DRAWINGS

FIG. 21 is the Examine Menu sent to a local or remote terminal or computer.

FIG. 22 is the data display screen sent to a local or remote terminal or computer.

DETAILED DESCRIPTION OF THE INVENTION

Figure 1:
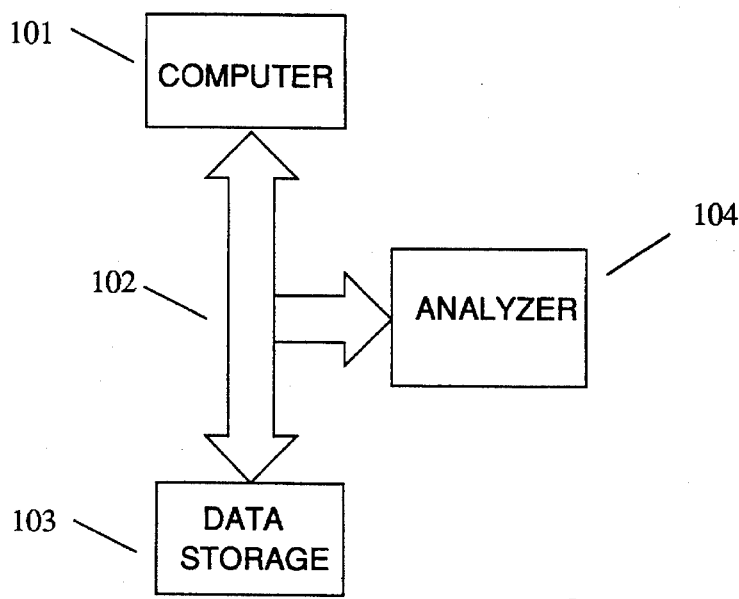
FIG. 1 shows the ATA analyzer in the minimum useful configuration.
Figure 6:
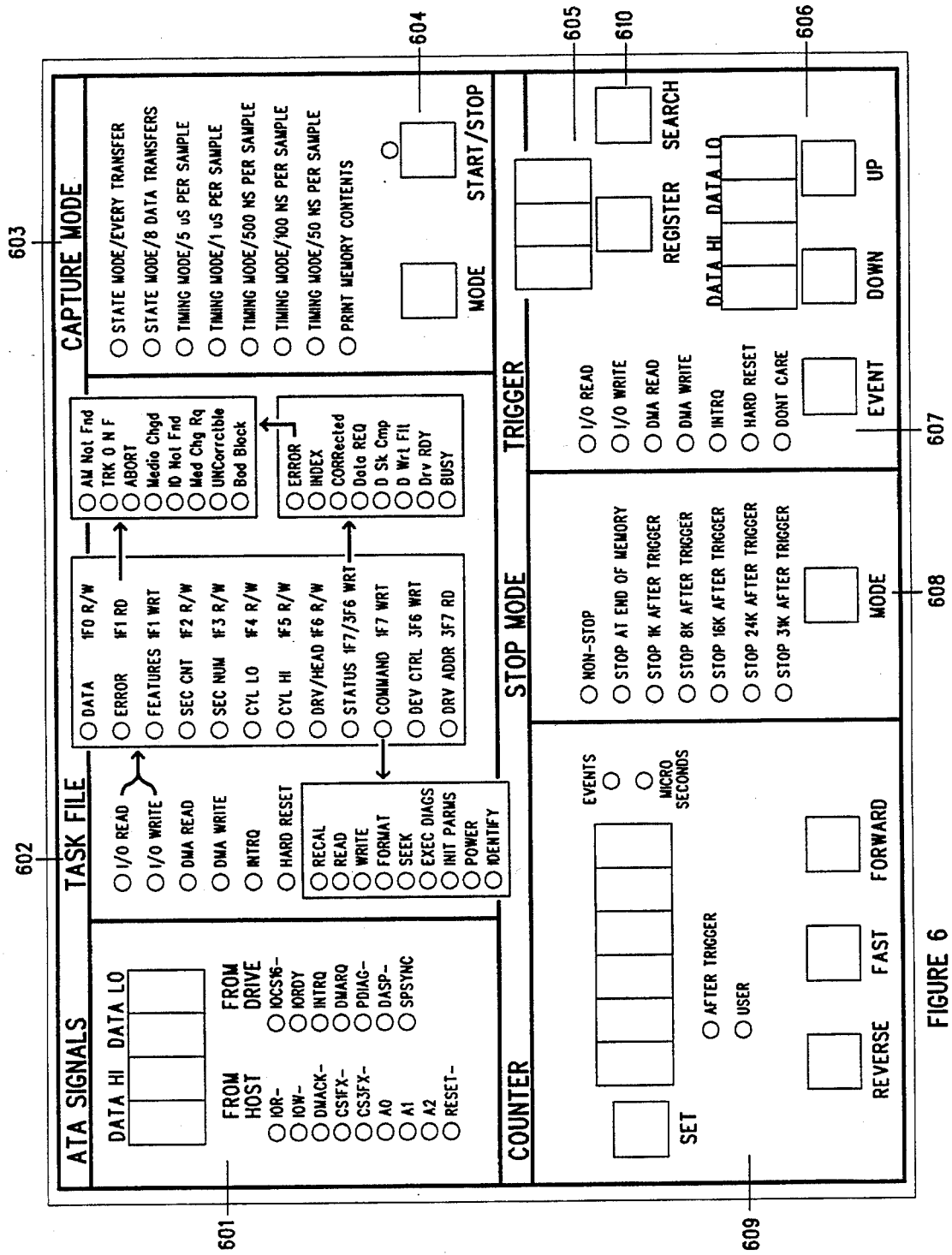
FIG. 6 shows the front panel display and input keys.
Figure 9:
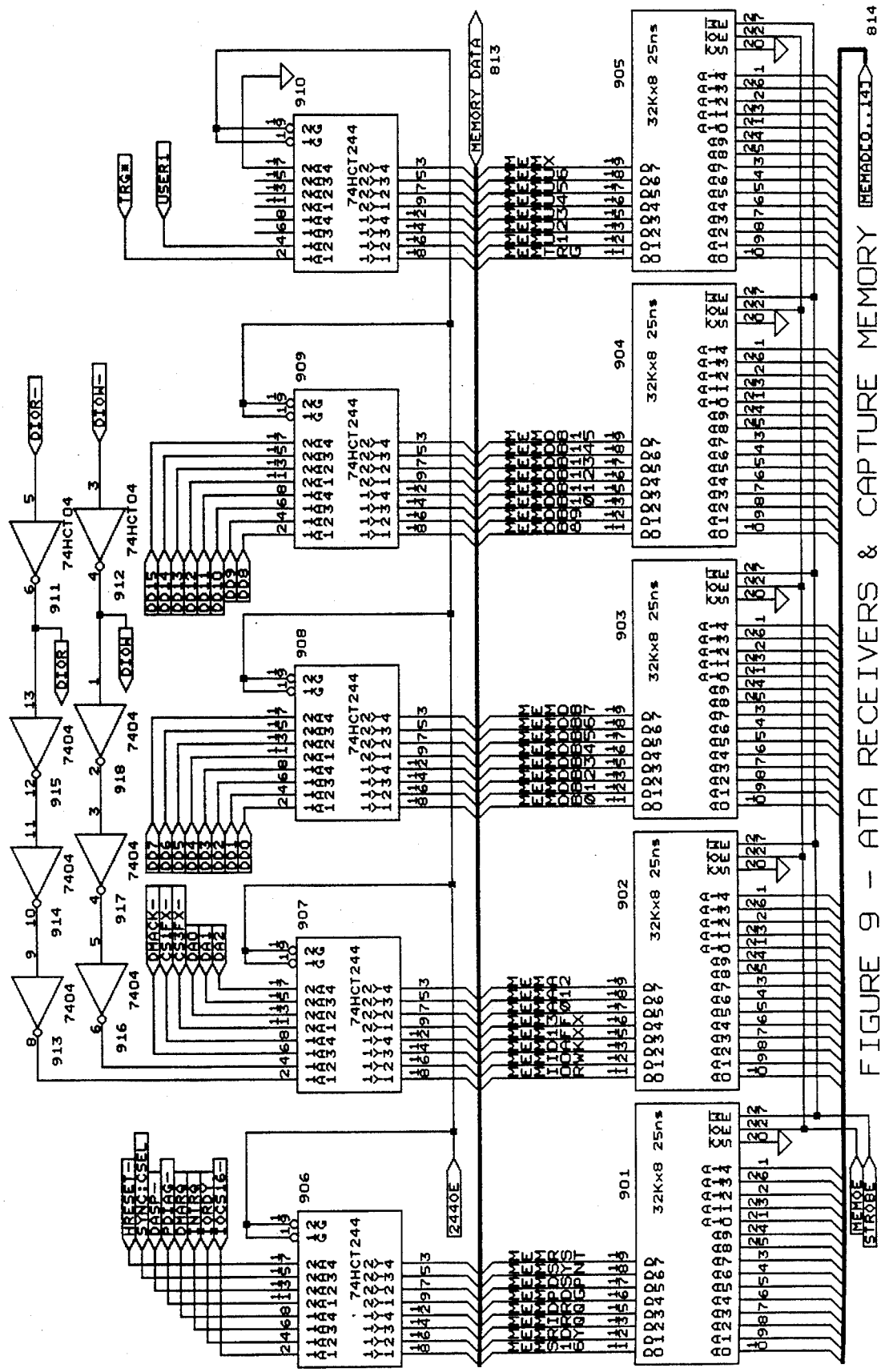
FIG. 9 is the schematic of ATA buffers, timing skew circuits, and data storage.

The invention includes a method and apparatus for recording, decoding, and displaying ATA bus signals. The theory of operation of the invention is as follows:

As shown in FIG. 1, the analyzer 104 connects to the ATA bus cable 102 as if it were a peripheral 103. The analyzer adds less than 25 pf in capacitance to each ATA signal and sinks or sources no more than 50 microamps of current from each signal. As shown in FIG. 6, the analyzer records (or captures) the ATA signals using either a state capture mode 603 or a timing capture mode 603. As FIG. 9 illustrates, the preferred embodiment has 32,768 addressable memory locations for storing ATA signal conditions. Each memory location is 40 bits wide such that all ATA signals can be captured (or recorded)into one memory location.

Figure 2:
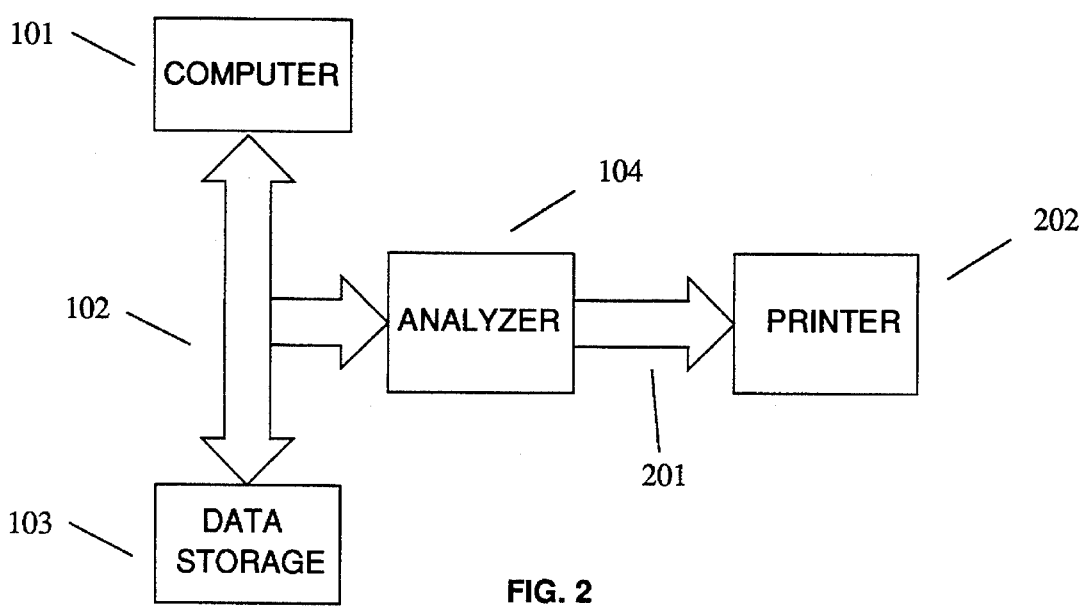
FIG. 2 adds the connection of a printer to the configuration of FIG. 1.
Figure 3:
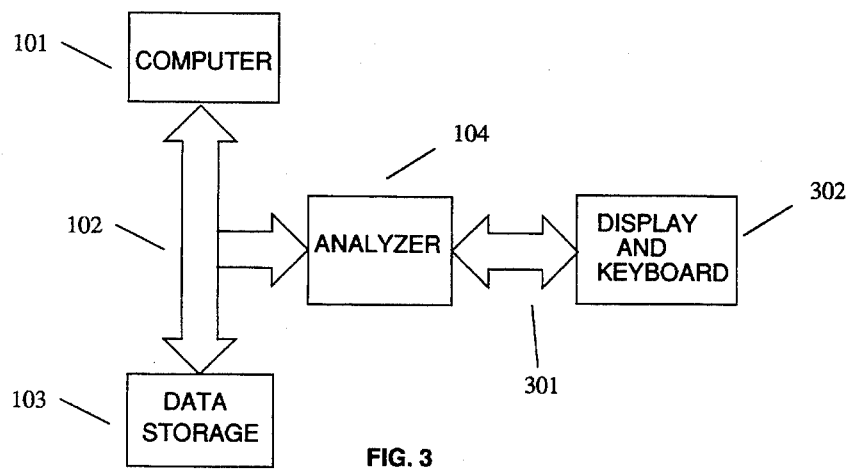
FIG. 3 adds the connection of a terminal to the configuration of FIG. 1.
Figure 4:
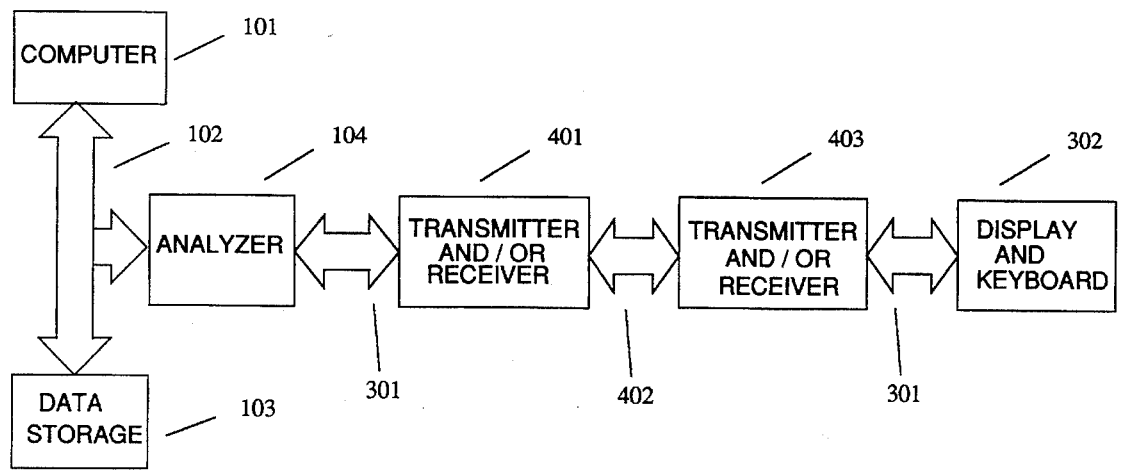
FIG. 4 shows the ATA analyzer being used for remote diagnostics.

When the capture is completed, the user may view the captured data on the analyzers display 104, or on an optional terminal screen 302, or on an optional paper printout 202, as shown in FIG. 1, FIG. 2, or FIG. 3. The capture begins when the user presses the Start/Stop button 604, shown in FIG. 6. It can also be stared when the ASCII character "R" or "r" (r is for run) is received from the keyboard 302 over the serial port 301. The capture is halted when the user presses the Start/Stop button 604. It can also be halted when the ASCII character "H" or "h" (h is for halt) is received from the keyboard 302 over the serial port 301. It can also be halted when the stop condition specified in the stop mode 608 is met. Once the capture is halted, the user may examine the captured data using the built in display shown in FIG. 6, or view the data on the terminal screen 302. If the operator is using a terminal keyboard and display 302 to setup, start, and stop the analyzer, and view the captured data, the terminal may be either local as shown in FIG. 3, or remote as shown in FIG. 4. In the preferred embodiment, the local transceiver 401 and the remote transceiver 403 are modems, with a telephone line as the transmission medium 402.

An alternative embodiment incorporates the modem into the analyzer to ease the setup procedure in remote diagnostics applications. Another alternative embodiment eliminates the direct mode of operation. Doing so decreases the costs and size of an ATA analyzer. This embodiment can only be used for local or remote applications.

METHODS FOR USING THE ATA ANALYZER

As discussed earlier, the methods for using the ATA analyzer include: 1) direct control using the built in displays and keys, 2) local control by a local terminal or computer, and 3) remote control by a remote terminal or computer. In the remaining text, these methods will be referred to as direct, local, and remote. All three methods require the user to make the same decisions regarding capture mode, stop mode, and trigger pattern. However, captured data is displayed to the user differently in direct operation than it is in local or remote operation.

Setting up the ATA analyzer involves selecting a capture mode, a stop mode, and if required, a trigger pattern.

Selecting a Capture Mode

Figure 13:
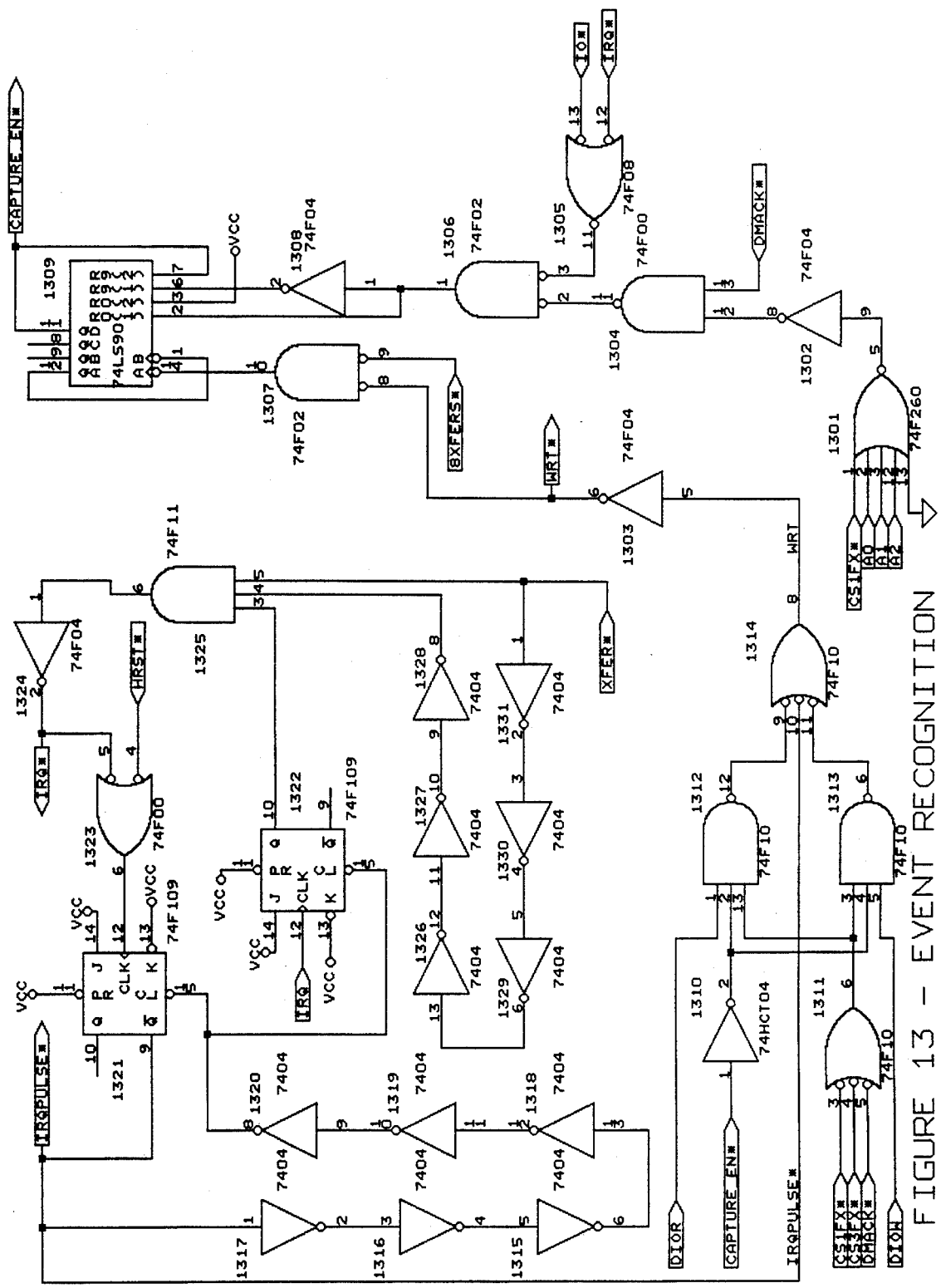
FIG. 13 is the schematic of the event recognition and capture circuitry.

For direct operation, as shown in FIG. 6, a capture mode is selected by pressing the mode button in the Capture Mode box 603. Each time the mode button is pressed, the light emitting diode (LED) that is currently lit shuts off and the next LED in the column turns on, indicating the new capture mode that has been selected. The user may select either a state mode of capturing, or a timing mode. The state mode of capture uses an event recognition circuit as shown in FIG. 13 to recognize when a valid event is occurring and store the event in the addressable memory, shown in FIG. 9. The timing modes of capturing 603 sample the ATA bus at a user selected time interval. The timing modes of capturing allow timing information to accompany each capture since a known amount of time has elapsed between each capture. This method of making timing measurements is preferred because it requires no additional memory for a time-stamp. Thus the manufacturing costs are reduced. An alternative embodiment includes memory for a time stamp as shown in the Stitzlein, et al. U.S. Pat. No. 4,628,511. The time-stamp method, although more expensive, carries the advantage of providing timing information during a state mode capture. The preferred embodiment provides no timing if a state mode of capture is used, but is less expensive to produce, and can still provide timing information using a timing mode of capture.

There are two options for state mode capture the user may select from. The "State Mode/Every Transfer" option 603 will capture every valid event. The "State Mode/8 Data Transfers" option 603 will capture every transfer except transfers to or from the Data Register (Reg. 1F0). Transfers to or from the Data Register (1F0) which occur after the first eight Data Register transfers will not be captured. The "State Mode/8 Data Transfers" option has the advantage of storing more command sequences in the buffer than the "State Mode/Every Transfer option because only the first 8 Data Register transfers are stored out of the 256 transfers in the data transfer sequence. The user would select "State Mode/8 Data Transfers" 603 when the command sequences are important, but the data is not. Another embodiment would also include a capture mode which only captures the first in a sequence of identical Status Register 602 I/O Reads. This would use the memory locations even more efficiently.

The state modes will perform a capture every time a valid ATA event occurs. As shown in FIG. 6, a valid event 602 is defined as a Task File I/O Read, Task File I/O Write, DMA Read, DMA Write, Interrupt Request, or Hard Reset.

The Capture Mode box 603 also contains a selection called "Print Memory Contents". This selection allows the user to print the captured data on a printer 202 in the same form that it appears on a local or remote terminal, as shown in FIG. 22. The start button 604 is used to start or stop the print operation when "Print Memory Contents" is selected. The print operation will start at the location currently being displayed, as indicated by the counter 609.

Figure 20:
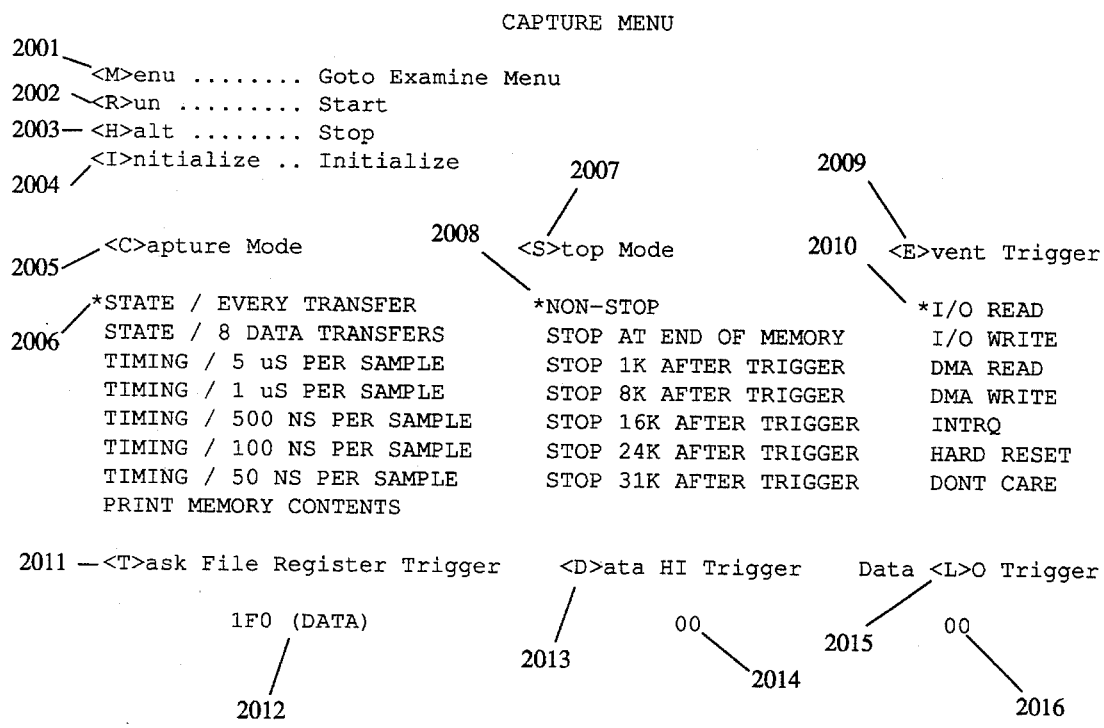
FIG. 20 is the Capture Menu sent to a local or remote terminal or computer.

The capture mode is selected during local or remote operation in a manner similar to direct operation. As shown in FIG. 20, the Capture Menu which is provided to the local or remote terminal (or computer) 302 also has a Capture Mode column 2005. The user can change the capture mode by sending an ASCII "C" over the serial port 301 by pressing the "C" character on his terminal (or computer) keyboard. Each time the "C" is received over the serial port the analyzer changes the lit LED in the Capture Mode box 603. The analyzer also sends a new Capture Menu over the serial port with the asterisk 2006 changed to indicate the new capture mode, as shown in FIG. 20.

Selecting a Stop Mode

For direct operation FIG. 6 a stop mode is selected by pressing the mode button in the Stop Mode box 608, similar to selecting a capture mode.

When the "Non-Stop" mode 608 is selected the analyzer continues capturing even after the end of the buffer is reached. Instead of stopping, it wraps around to the beginning of the buffer and continues capturing, overwriting the old data. Once the analyzer is manually stopped, using the Start/Stop button 604, the memory contains the last events that occurred on the ATA bus.

When the "Stop at End of Memory" mode 608 is selected the analyzer stops capturing when its memory is full. Thus, at the end of the capture, the memory contains the first events that occurred on the ATA bus.

When a "Stop After Trigger" mode 608 is selected the analyzer stops a specified number of events after the selected trigger pattern occurs on the ATA bus. There are five different "Stop After Trigger" modes to select from, each stopping a different number of events after the trigger occurs. When the "Stop 1K After Trigger" mode 608 is selected, then at the end of the capture the memory contains 1024 (1K) captures which occurred after the trigger. Since the preferred embodiment has 32,768 memory locations, there would be 31,744 (31K) captures in memory that occurred previous to the trigger. In the same manner, if the "Stop 8K After Trigger" mode is selected, there are 8192 (8K) captures after the trigger, and 24,576 (24K) captures previous to the trigger. The other stop modes are "Stop 16K After Trigger", "Stop 24K After Trigger", and "Stop 31K After Trigger". These "Stop After Trigger" mode selections allow the user to select how many captures occur before the trigger and how many occur after. Prior art analyzers were generally limited to "Start on Trigger" or "Stop on Trigger".

The stop mode is selected during local or remote operation in a manner similar to direct operation. The Capture Menu shown in FIG. 20 provides a "Stop Mode" column 2007 to the local or remote terminal. The user can change the stop mode by sending an ASCII "S" over the serial port 301 by pressing the "S" character on his terminal keyboard. Each time the "S" is received over the serial port the analyzer changes the lit LED in the Stop Mode box 608. The analyzer also sends a new Capture Menu over the serial port with the asterisk 2008 changed to indicate the new stop mode, as shown in FIG. 20.

Selecting a Trigger Pattern

The ATA analyzer allows a user to select a trigger pattern without requiring user knowledge of the function of each ATA signal. The user selects the trigger by identifying an ATA event 607, and optionally a register 605 and data pattern 606 to be used for triggering. The analyzer trigger circuitry decodes the ATA signals and triggers when an ATA event matches the event 607 selected by the user. The analyzer leads the user in trigger selection by automatically removing trigger combinations from the display which do not occur on the ATA bus. The Register trigger selection 605 is only valid for I/O Read and I/O Write operations, so the Register trigger display is blanked if any other trigger events are chosen. The Data trigger is not valid for INTRQ and Hard Reset events so the Data trigger display is blanked if INTRQ or Hard Reset are chosen. Since the Hi Data trigger 606 is not valid for Register triggers except for 1F0, the Hi Data display is blanked for any Register besides 1F0. The analyzers ability to distinguish between valid and invalid trigger patterns ensures that even those who are not experts on the ATA interface will still be able to select a valid trigger pattern.

For direct operation FIG. 6, a trigger pattern is selected by pressing the Event key 607 until the LED next to the desired event is lit. If the Register trigger display 605 is lit up when the desired Event 607 is selected, then the user presses the Register key 605 to cycle through the 12 possible Task File Registers until the desired register is selected. A 13th cycle blanks the Register display so the user can place the Register trigger in a "Don't Care" state. If the Data Hi and/or Data Lo Displays 606 are lit, the user selects a Data trigger pattern using the "Up" and "Down" keys. Holding an "Up" or "Down" key down will increment or decrement the data pattern quickly. After eight increments or decrements of the Data trigger the Data trigger display will be blanked, which places the Data trigger in a state of "Don't Care".

The trigger pattern is selected during local or remote operation in a manner similar to direct operation. The Capture Menu shown in FIG. 20 is provided to the local or remote terminal 302 with an Event Trigger column 2009, a Task File Register Trigger 2011, a Data Hi Trigger, and a Data Lo Trigger. The user can change the trigger event by sending an ASCII "E" over the serial port 301 by pressing the "E" character on his terminal keyboard. Each time the "E" is received over the serial port, the analyzer will change the lit LED in the Trigger Event box 607. The analyzer will also send a new Capture Menu over the serial port with the asterisk 2010 changed to indicate the new event trigger, as shown in FIG. 20. The user can change the trigger register by sending an ASCII "T" over the serial port 301 by pressing the "T" character on his terminal keyboard. Each time the "T" is received over the serial port the analyzer will cycle the 3-digit hexadecimal display 605 to the next register. The analyzer will also send a new Capture Menu over the serial port with the trigger register 2012 changed to indicate the new trigger register, as shown in FIG. 21). The user can change the Data Hi trigger by sending an ASCII "D" over the serial port 301 by pressing the "D" character on his terminal keyboard. Each time the "D" is received over the serial port the analyzer will send a prompt asking the user to input a 2-digit hexadecimal number. The analyzer updates the 4-digit hexadecimal display 606, with the value entered by the user. The analyzer will also send a new Capture Menu over the serial port with the Data Hi trigger 2014 changed to indicate the new Data Hi trigger, as shown in FIG. 20. The user can change the Data Lo trigger by sending an ASCII "L" over the serial port 301 by pressing the "L" character on his terminal keyboard. Each time the "L" is received over the serial port the analyzer will send a prompt asking the user to input a 2-digit hexadecimal number. The analyzer updates the 4-digit hexadecimal display 606 with the value entered by the user. The analyzer will also send a new Capture Menu over the serial port with the Data Lo trigger 2016 changed to indicate the new Data Lo trigger, as shown in FIG. 20.

Performing the Capture

For direct operation FIG. 6, the capture is begun by pressing the Start key. While the capture is running, the display for ATA signals 601 and the display for Task File events and registers 602 are constantly updated so the user can see a real-time display of the events that are occurring on the ATA bus. This indication of current bus activity is useful in determining if the host computer 101 has halted. The Counter display is also constantly updated giving the user an indication of how full the analyzer's buffer is, and how fast it is being filled. When the capture stops, due to either a manual stop 604, or by a stop condition being satisfied 608, the analyzer beeps to indicate that it has halted. It also jumps back to the first capture in the current series of captures in the buffer memory and assigns this capture an event or microseconds count of "00000" on the Counter 609.

For local or remote operation, the capture is started by sending an ASCII "R" over the serial port 301 by pressing the "R" character on the terminal keyboard, as indicated in the Capture Menu 2002. When the capture begins, the analyzer prints "Running" on the terminal display, and sends a period (.) every second as an ongoing indicator that the analyzer is running. When the capture stops, due to either a manual stop 2003, or by a stop condition being satisfied 2007, the analyzer sends the Examine Menu over the serial port indicating the options available to the user for viewing the captured data, as shown in FIG. 21.

Examining the Captured Data

For direct operation as shown in FIG. 6, examining the captured data involves looking at each capture individually. The ATA Signals section 601 shows which signals were asserted. Two separate columns are used to distinguish host computer signals from disk drive signals. The data signals are shown in hexadecimal. The signals are decoded by the analyzer and displayed in the Task File section 602 as an event. If the event is an I/O Read or I/O Write, then the Task File Register involved is displayed also. If the Task File Register is the Error, or Status, or Command register, then the Data Lo byte is decoded to generate a further description of the operation. The user may also determine the state of a non-ATA signal using a separate user input probe and the "User" LED in the Counter section 609.

The user selects which of the 32,768 captures to examine using the Reverse, and Forward keys in the Counter section 609. The user may move forward or reverse through the memory quickly by holding down the Forward or Reverse key, which causes the analyzer to automatically cycle through memory locations. As the Counter 609 is changed in the forward or reverse direction, the analyzer updates the ATA Signals section 601 and the Task File section 602 for each location. The Fast key 609 may be held down along with the Forward or Reverse key 609, or the Up or Down key 606 to go even faster.

The Events LED in the Counter section 609 is lit when the capture is performed in state mode. This indicates that each counter location is an event. The Microseconds LED is lit if the capture is performed in a timing mode. This indicates that each counter location represents an amount of time. The amount of time represented depends on which sample rate is used. Decimal points are shown in the counter digits to indicate when samples occur less than a microsecond apart. For example, a 50 nanosecond sample rate is indicated in increments of 000.05 microseconds. A 100 nanosecond sample rate is indicated in increments of 0000.1 microseconds.

The Set key 609 allows the user to zero the counter at a particular location. This enables the user to see the difference in time or events from one particular capture to another capture in memory.

The After Trigger LED 609 is lit when the event being displayed occurs after the trigger event. This identifies whether the capture location being examined occurs before or after the trigger location.

Pressing the Search key 610 causes the analyzer to search its memory for the event specified by the currently selected trigger pattern. The trigger pattern need not be the same one used to trigger while capturing. The trigger "Don't Care" options apply to the search feature as well. The search feature allows the user to specify the event(s) of interest and have the analyzer automatically jump to the next occurrence of that event.

For local or remote operation, examining the captured data is similar to direct operation. A benefit of examining the capture in local or remote mode is that the user may view nineteen events at one time on the terminal screen as shown in FIG. 22. Another benefit of local or remote mode is that the Description column 2207 is available to provide more detail than is available in direct mode. Another benefit of local or remote mode is that the user may jump forward 2108 or reverse 2109 a selectable number of events between one hundred and one thousand. Another benefit of local or remote operation is available if the terminal 302 is actually a computer with its own storage capability. The captured data may be stored in the computers storage system for future reference. The entire capture may be transferred to the computer using the "<T>ransfer" function 2107 in the Examine Menu which is invoked by pressing a "T" on the terminal keyboard, as shown in FIG. 21. In the menu's, the character in brackets always indicates the letter to be pressed to invoke that function.

The "<F>orward" function 2102 causes the analyzer to send the next display page as shown in FIG. 22. The "<R>everse" function 2103 causes the analyzer to send the previous display page as shown in FIG. 22. The "<SPACE>" (for spacebar) function 2104 causes the analyzer to add one more line at the bottom of the current display page. The "<Z>ero" function 2105 sets the counter 609 to zero at the current location, the same as the "Set" function 609 in direct mode. The "<S>earch" function 2106 causes the analyzer to search for the currently defined trigger pattern, the same as the "Search" function 610 in direct mode.

If the user is done examining and wishes to go back to the "Capture Menu" to set-up or perform another capture, the "<M>enu" function 2101 accomplishes this.

DESCRIPTION OF ATA ANALYZER CIRCUITRY

Figure 5:
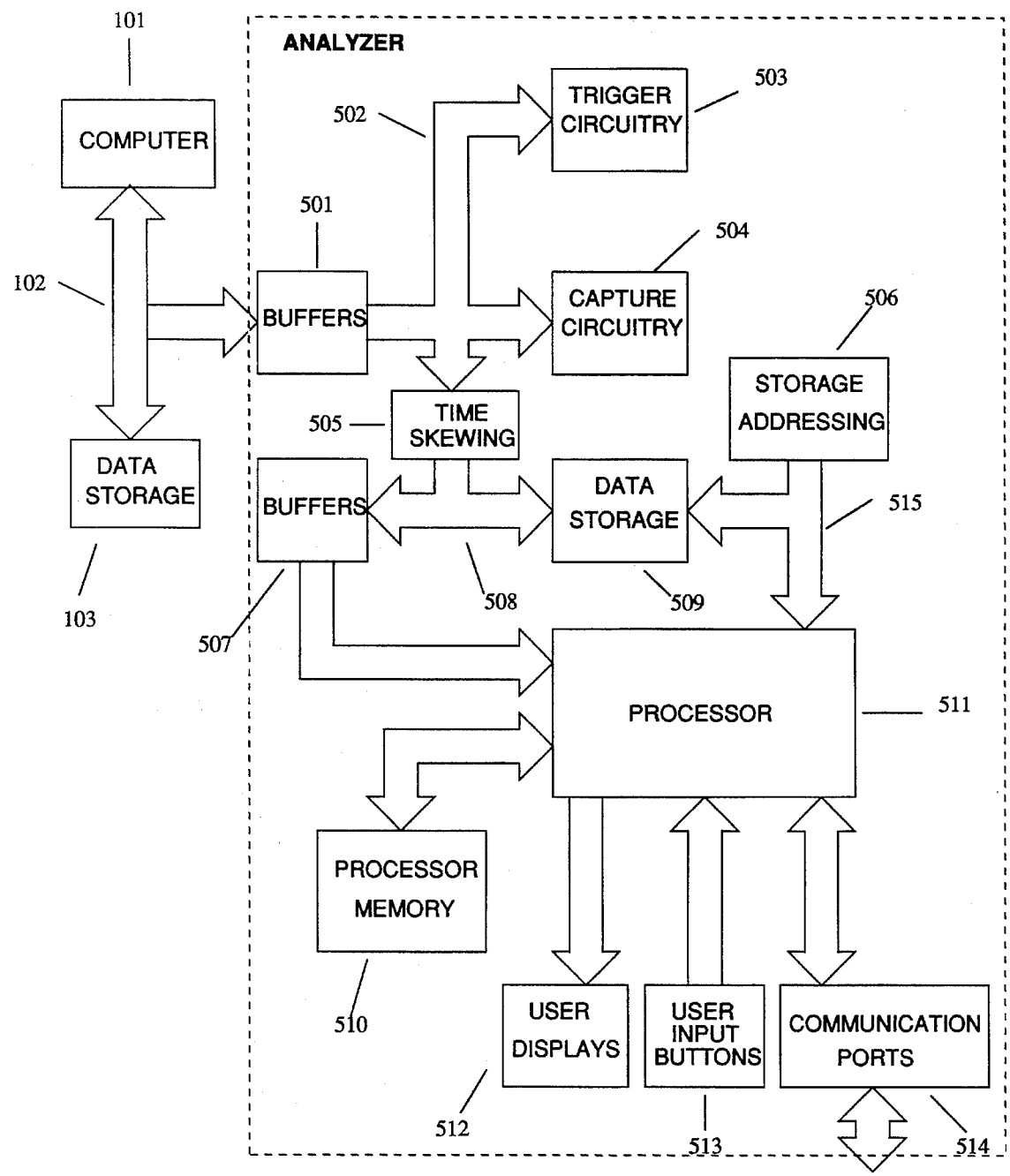
FIG. 5 shows a block diagram of the ATA analyzers internal circuitry.

The primary functional blocks within the ATA analyzer are shown in FIG. 5. The ATA input buffers 501 provide the current to drive the other circuits in the analyzer without loading the ATA bus. The buffers drive the memory data bus 502 which feeds the Trigger Circuitry 503, and Capture Circuitry 504. For most signals the Memory Data bus 502 also directly feeds the Data Storage 509, and Processor Buffers 507. Some Memory Data bus signals 502 require Time Skewing 505 before passing on to the Data Storage 509 and Processor Buffers 507. The Trigger Circuitry 503 compares the Memory Data bus with a user selected trigger pattern and, on a match, generates a signal used to stop the capture. The capture circuitry 504 consists of an event recognition circuit used for state mode captures, a clock divider circuit for timing mode captures, and the stop circuitry which monitors the stop conditions 608. The capture circuitry generates the write strobe used to strobe the data on the Memory Data bus 502 into the Data Storage 509. The same write strobe is also used by the Storage Addressing circuit 506 to increment the address of the Data Storage. The Data Storage 509 is a 32K by 40-bit memory which stores the state of the Memory Data bus 502 each time it receives a write strobe from the Capture Circuitry 504. The location within the memory is provided by the Storage Addressing circuit 506. The Processor Buffers 507 allow the Processor 511 to monitor the Memory Data bus 502 while capturing, and to read the Data Storage 509 while examining. The Processor Memory holds the firmware instructions executed by the processor 511. The Processor 511 is a microcontroller with its own data memory and support for a serial interface. The User Displays 512 are LED's and hexadecimal displays as shown in FIG. 6. The User Input Buttons 513 are monitored constantly by the Processor 511 during examining, while only the Start/Stop key 604 is monitored while capturing. The Communication Ports 514 are a parallel printer port and a serial port. The serial port can be used for either communicating with a local or remote terminal, or printing to a serial printer.

Microprocessor Circuit

Figure 7:
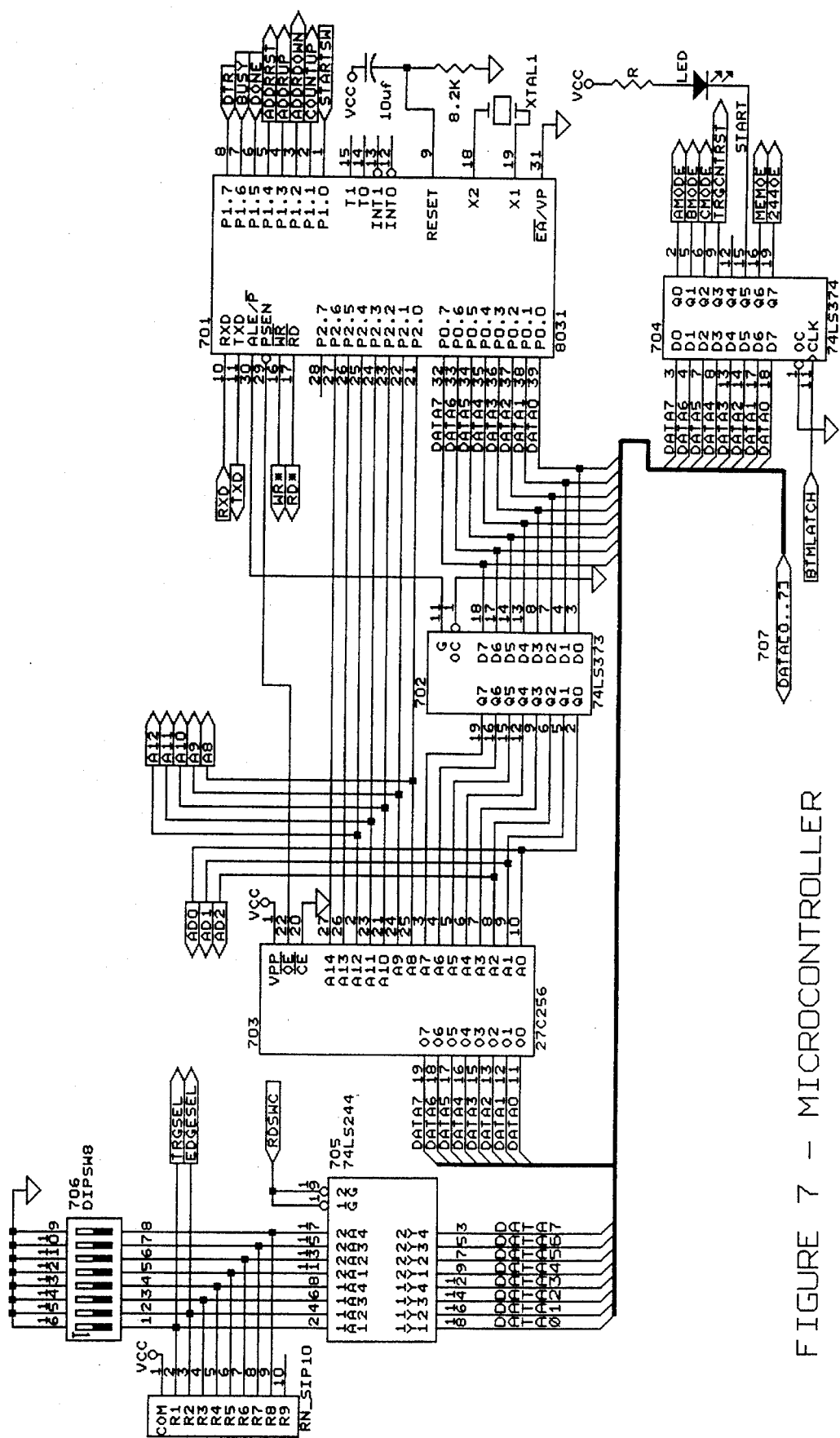
FIG. 7 is the schematic of the internal microcontroller.

The microprocessor circuit shown in FIG. 7 is implemented using an Intel "8031" microcontroller 701. The crystal frequency is 11.059 MHz, which is required to support serial communications at the standard baud rates. The microcontroller is able to read eight dip switches 706 by reading buffer 705. The dip switches allow the user to configure the serial port baud rate, whether the trigger circuits are replaced by an external trigger signal, whether the external trigger provides a rising or falling edge, and whether the analyzer displays all of the data signals 601, or only the valid signals.

The microcontroller 701 receives and handles the serial port RX, TX, and DTR signals. It also monitors the parallel port BUSY signal while printing to a printer. It also monitors the DONE signal which indicates that the capture has been stopped. The microcontroller 701 uses the ADDRRST signal to reset the memory address back to zero 1002 before starting a capture. It uses the ADDRUP 1003 and ADDRDOWN 1004 signals to increment or decrement the memory address when the user is examining it. It uses the COUNTUP signal 1001 to preset the stop counter. The microcontroller also monitors the STARTSW signal to determine if the user has pressed the Start/Stop key 604.

The microcontroller is able to select the capture mode by writing the BTMLTCH latch 704 and setting the AMODE, BMODE, and CMODE signals. The microcontroller resets the trigger and counter using the TRGCNTRST signal 704. The microcontroller also uses the BTMLTCH 704 to turn on the "Start" LED, enable the memory outputs "MEMOE" and enable the ATA signals shown in FIG. 9 onto the Memory Data bus 502 using the "244OE" signal (906 through 910).

Figure 8:
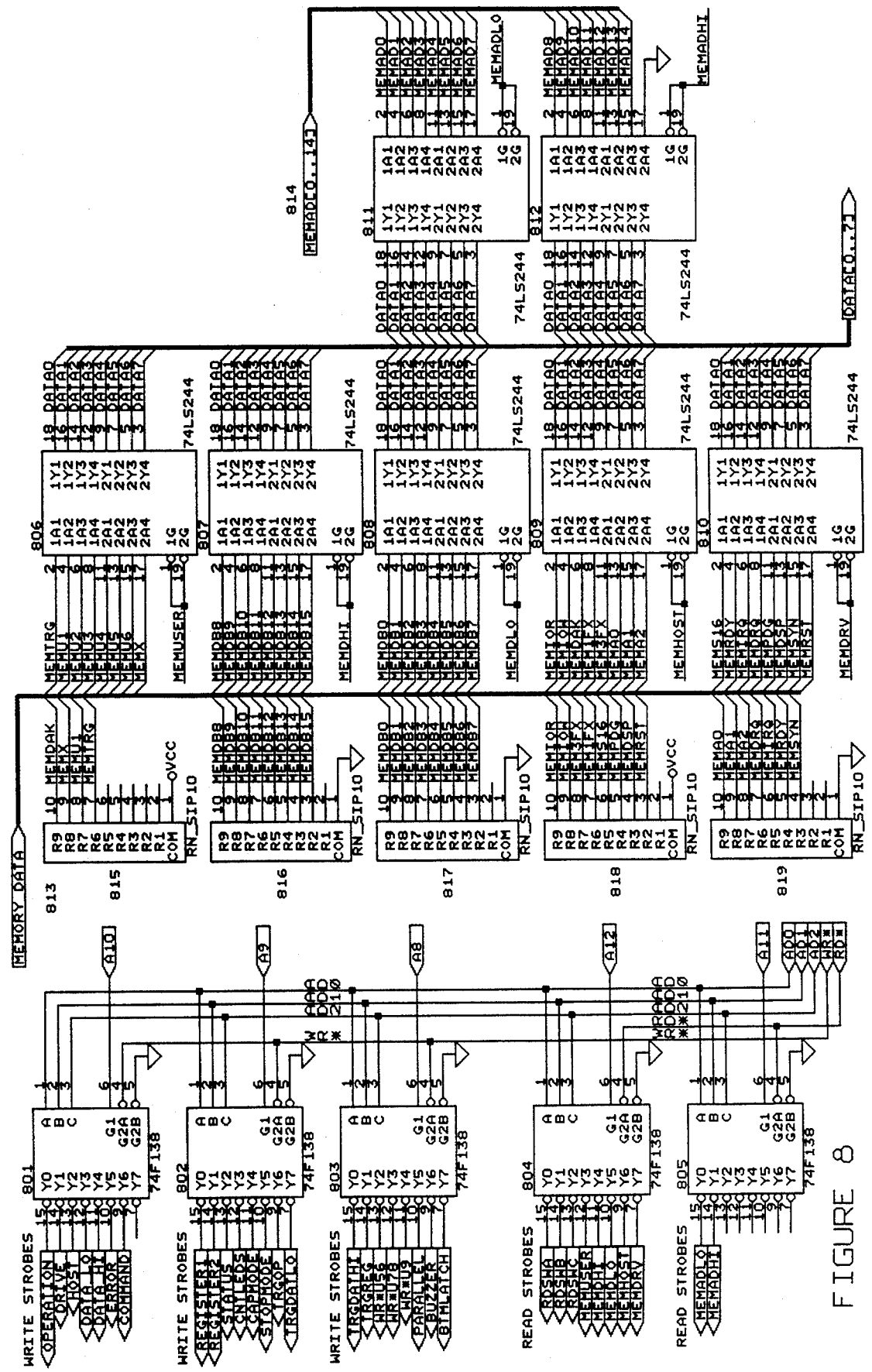
FIG. 8 is the schematic of microcontroller address decoders and ATA data and address access ports.

FIG. 8 shows the registers the microcontroller accesses in order to read the Memory Data bus 813, and the Memory Address bus 814. FIG. 8 also shows the circuits used to decode the address and generate the strobes the analyzer registers that the microcontroller writes or reads. The write strobes generated by decoders 801 and 802, and part of 803 are used for writing the displays on the analyzers top panel FIG. 6. Decoder 803 also strobes data into the parallel printer port register 1102, drives the audible buzzer 1103, and writes the BTMLTCH 704. The read strobes are used to read the dip switches 705, the keys on the top panel shown in FIG. 12, the Memory Data bus 813, and the Memory Address bus 814.

Data Storage Circuit

The data storage circuit shown in FIG. 9 is implemented using five 32K×8 SRAMs (901 through 905) with an access time of 25 nanoseconds. During a capture the SRAM's output enable (OE) is deasserted. The data on the Memory Data bus 813 is strobed into the memory using the SRAM's write enable (WE) signal. While examining, the SRAM's output enable (OE) is asserted. The microcontroller reads the Memory Data bus 813 by reading the Memory Data bus access pods (806 through 810).

During a capture, the ATA bus signals are enabled onto the Memory Data bus 813 through CMOS buffers (906 through 912). The DIOR- and DIOW- ATA signals (911 and 912) go through a delay circuit (913 through 918) before being placed on the Memory Data bus 813. This delay is necessary to capture the DIOR- and DIOW- signals in their asserted (low) state. Since state mode captures are strobed into memory by the undelayed DIOR- or DIOW- signal, the delay ensures that the state mode stores the asserted DIOR- or DIOW- signal. This is necessary because the microcontroller decides whether the operation is a Read or Write event 602 based on the state of the captured DIOR- and DIOW- signals.

Four of the five SRAMs (901 through 904) are used for storing the state of the ATA bus. The fifth SRAM 905 is used for storing the status of the trigger, a user input "USER1" and a signal "MEMX" which indicates that the memory location holds an ATA capture.

After the user starts the capture 604 but before the analyzer starts capturing, the microcontroller first initializes the memory contents. The microcontroller initializes the memory by disabling the ATA bus buffers (906 through 910) and writing the entire buffer with the state of the Memory Data bus 813 as preset by the pull-up and pull-down resistors (815 through 819). The pull-up and pull down resistors set each buffer bit to its ATA deasserted state. Since the "MEMX" signal 815 is pulled up during initialization, but set low during a capture, the "MEMX" signal may be used to indicate if a memory location was used for a capture (MEMX=0), or if the memory location is still empty (MEMX=1).

Data Storage Addressing Circuit

Figure 10:
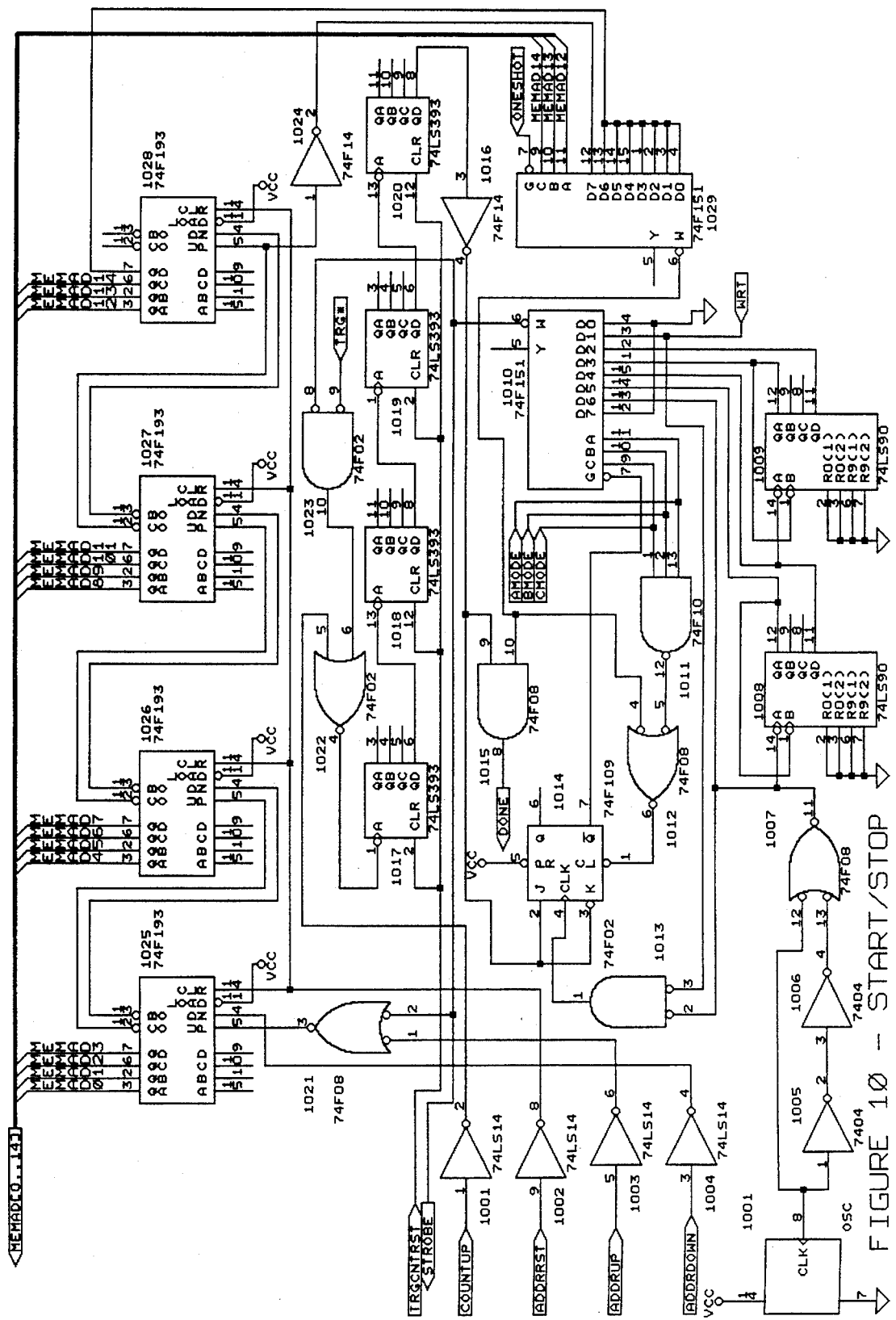
FIG. 10 is the schematic of storage addressing, capture mode selection, and start/stop control.

The data storage addressing circuit is shown in FIG. 10. Four cascadeable up/down counters (1025 through 1028) are used to increment, decrement, or reset the address. Random address access is not used in this implementation, but could be used, especially if the user interface FIG. 6 also supports random access by the user, and not just sequential access as in the current invention. During a capture, the address is incremented after each write into memory. The address is incremented on the rising edge of the "UP" input to the first cascadeable counter 1025. During a capture, the "UP" input is generated by the same strobe used to strobe the data into the SRAM's. This strobe is generated by the capture mode selector 1010. When the capture mode selector 1010 is configured to use the "Timing Mode/50 ns per Sample" mode of capturing, the sample rate is so fast that address setup time for the 25 ns SRAMs becomes a problem. This problem is solved by varying the duty cycle of the 20 Mhz clock which is used to write the data into memory and increment the address. Since the cascadeable counters used for addressing require up to 20 ns to change the address, and since 10 ns of address setup time is required by the memory chips, there must be at least 30 ns in between write strobes to allow for address changing and address setup time. The 50 ns write cycle is adjusted to provide a 20 ns write strobe and 30 ns between write strobes by the duty cycle circuit (1005 through 1007).

While the memory is being examined, the microcontroller generates the "UP" strobe 1003 to access and display the next memory location, and generates a "DOWN" strobe 1004 to access and display the previous memory location.

Capture Select and Start Circuit

The capture mode is selected by the microcontroller using the AMODE, BMODE, and CMODE input selects on a multiplexer 1010. The multiplexer is used to select between six possible write strobes, which correspond to the five timing capture modes, and the state capture mode. Another circuit which is discussed later is used to select which of the two state modes is sent to the multiplexer. The five timing capture modes use a clock pulse to strobe the data into memory. The clock is generated by a crystal oscillator 1001, a duty cycle circuit (1005 through 1007) and a clock divider circuit (1008 and 1009). The clock divider divides the 20 Mhz clock into frequencies of 10 Mhz, 2 Mhz, 1 Mhz, and 200 Khz. These frequencies provide the timing mode sample periods of 50 ns, 100 ns, 500 ns, 1 μs, and 5 μs 603.

The capture enable flip-flop 1014 ensures that the capture does not begin using a short write pulse from either the timing mode clock circuit or the state mode pulse generator. This is done by ensuring that the write pulse is not asserted 1013 when the capture is started. The capture is started when the AMODE, BMODE, and CMODE signals 704 are written with a pattern besides "111" or "000" binary, and the 50 ns timing mode and state mode write pulses are not asserted 1013.

Capture Stop Circuit

If the "Non-Stop" mode 608 is selected, the microcontroller must stop the capture in response to a user generated stop command. The memory addresses will wrap around to the beginning of memory and capture will continue until the user presses the "Stop" key 604. If the "Stop at End of Memory" mode 608 is selected, the capture stops when the last memory address is written, or the microcontroller can stop the capture in response to a user generated stop. If a "Stop After Trigger" mode 608 is selected, then the capture is stopped by a counter which starts counting captures when the trigger occurs. The microcontroller can also stop the capture in response to a user generated stop.

The microcontroller can stop the capture by setting the AMODE, BMODE, and CMODE bits to "111" binary.

The capture will automatically stop after the last memory location is written when the "Stop at End of Memory" mode 608 is selected. When this mode is selected the "ONE-SHOT" signal 1029 is asserted low and a multiplexer 1029 is enabled. When enabled, the multiplexer uses the last "UP" strobe which is going to the last 4-bit cascadeable counter 1028 as a stop strobe. The stop strobe is only enabled when the last address lines 14, 13, and 12 (1028 and 1029) indicate that this strobe is for the last address in memory. The stop strobe also asserts the DONE signal 1015, indicating to the microcontroller that the capture is done.

For the "Stop After Trigger" modes, four cascadeable counters (1017 through 1020) are used to count up to 32K. When 32K is reached the capture is stopped. Before starting the capture the microcontroller pre-loads the counters using the "COUNTUP" signal. The preloaded value is the number of captures to be held in memory occurring prior to the Trigger Event. For example, if the stop mode is "Stop 24K after Trigger", then the counter would be pre-loaded with a value of 8192 (8K), so that 24K more counts would result in the 32K required to stop the capture. The additional 24K counts would occur after the TRG* signal 1023 is asserted, resulting in 8K captures before the trigger and 24K captures after. When the final stage of the counter 1020 reaches a count of 32K, then an inverter 1016 drives the J and K inputs of the capture enable flip-flop 1014 low, which causes the next capture to disable the capture mode selector 1010. Thus the capture is halted. At the same time, the DONE signal 1015 is asserted indicating to the microcontroller that the capture is done.

Communications Circuits

Figure 11:
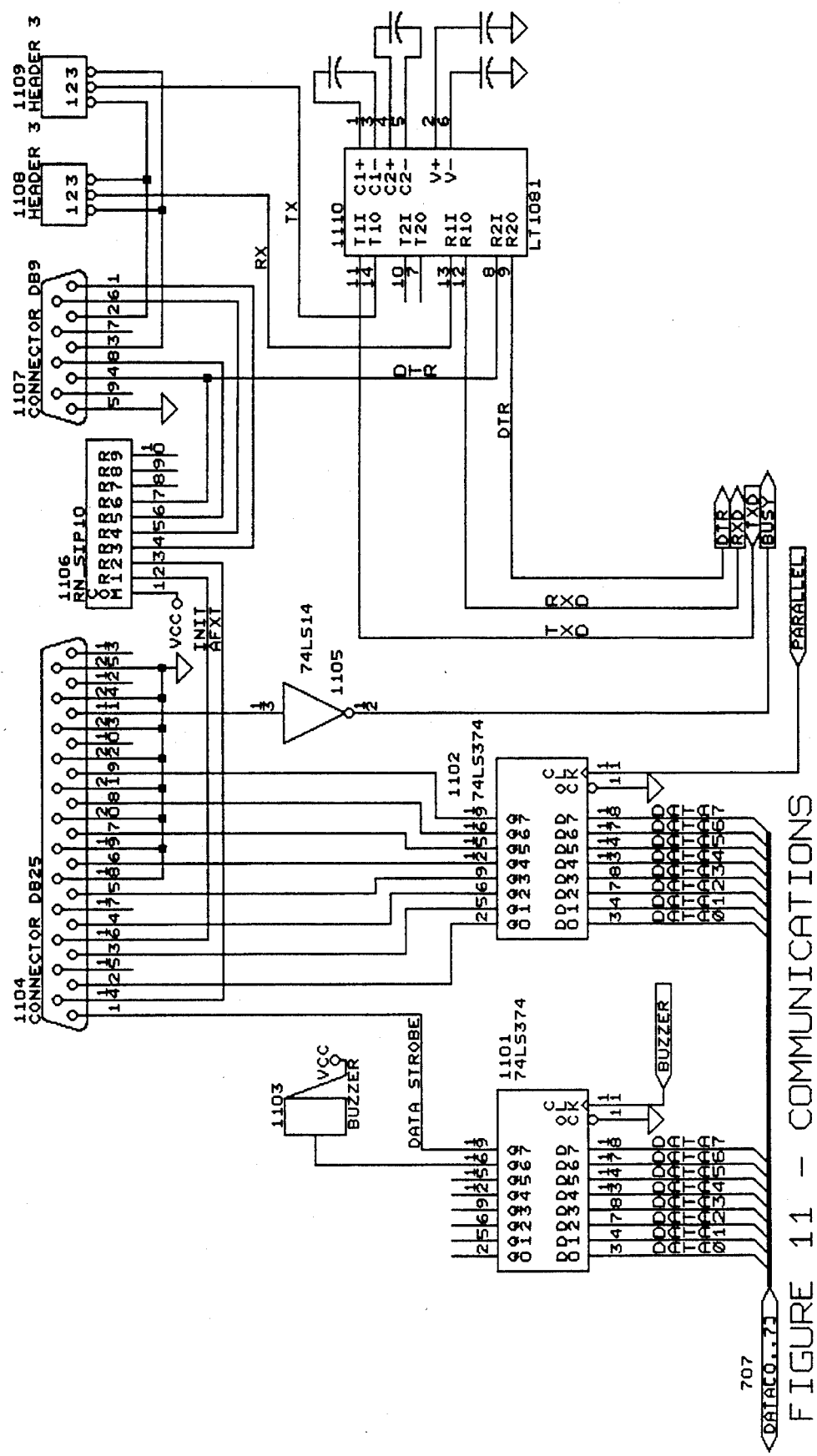
FIG. 11 is the schematic of serial and parallel communications ports.

The communications ports shown in FIG. 11 include a Centronics style parallel port 1104, and an RS-232 serial port 1107 which can be configured as DCE (Data Communications Equipment) or DTE (Data Terminal Equipment). This configuration is performed using jumpers (1108 and 1109).

The parallel port 1104 is used for printing to a parallel printer 202. The serial port 1107 can be used for local or remote terminal control, or to print to a serial printer. The microcontroller 701 reads a dip switch 706 to determine whether a terminal or serial printer is connected to the serial port 1107.

The microcontroller sends data to a parallel printer by loading the data into the parallel printer latch 1102. The microcontroller determines if the printer is ready to accept another character by polling the BUSY signal 1105. When the BUSY signal is not asserted, the microcontroller strobes the data to the printer by setting, then resetting the data strobe 1101.

The "8031" microcontroller 701 has the circuitry built in for communicating with a terminal, computer, modem, or printer over the RS-232 serial port 1107. The only external circuitry required is a level converter 1110 which converts the microcontrollers TTL level signals to the +/–12 Volt signals used by the RS-232 serial interface. The microcontroller uses the TX signal 1109 for transmitting data to the terminal or printer. The microcontroller uses the RX signal 1108 for receiving data from the terminal. The DTR (Data Terminal Ready) signal 1110 is monitored by the microcontroller and serial transfer is halted if the terminal or printer is not ready.

Pull-Up resistors 1106 reduce the difficulty of configuring the serial port as either DTE or DCE. The pull-up resistors drive certain signals, such as DTR, so that the printer or terminal or modem can use the signal as an input to determine that the analyzer is connected and ready. The pull-up resistors also allow the printer or terminal or modem to use those same signals as an output to indicate their own readiness, without overloading their output drivers.

Keyboard Circuits

Figure 12:
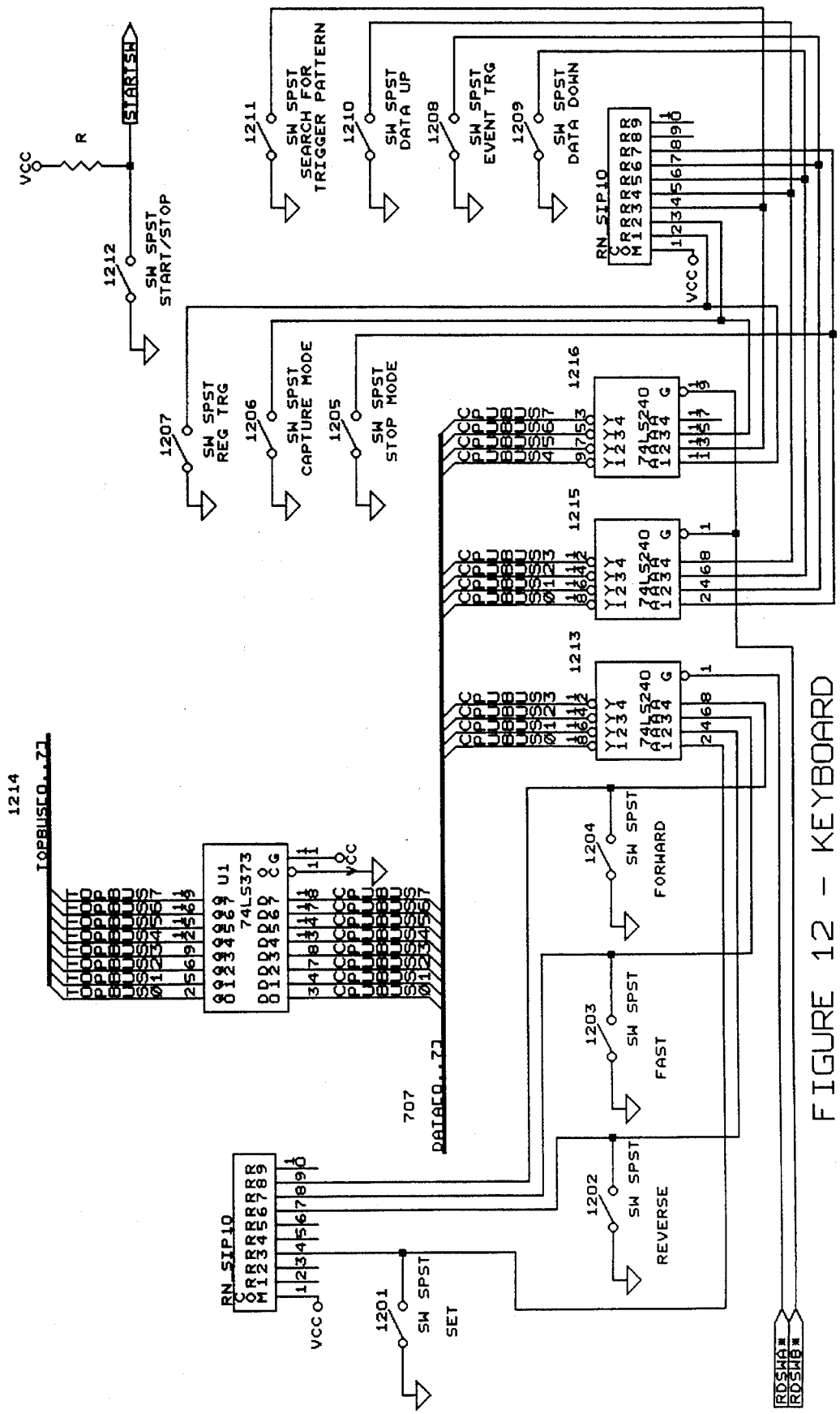
FIG. 12 is the schematic of the key switch interface and display bus driver.

FIG. 12 shows the circuits for passing user keystrokes to the microcontroller. The microcontroller 701 reads the counter section 609 keys (1201 through 1204) by reading a buffer 1213. The rest of the keys ( 1205 through 1211 ), except the Start/Stop key 1212, are read by reading another buffer (1215 and 1216). The Start/Stop key 1212 is a direct input to the microcontroller 701.

FIG. 12 also shows the bus driver 1214 which drives the many latches associated with the analyzers displays. This bus driver 1214 provides additional drive current, and reduces capacitance and noise on the microcontrollers address/data lines 707.

Capture Recognition Circuits

The capture recognition circuits are shown in FIG. 13. The capture recognition circuits are used to generate a write pulse 1314 when a state mode of capture is selected 603. The write pulse is used to strobe the ATA signals into the analyzers memory as shown in FIG. 9.

An IRQPULSE 1321 generates a write pulse 131 4. The IRQPULSE is generated whenever an ATA Interrupt Request event (INTRQ) 602 occurs, or an ATA Hard Reset event 602 occurs.

The DIOR signal 1312 will cause a write pulse 1314 if CAPTURE_EN 1310 is asserted and if the ATA 1FX or 3FX address 1311 is selected, or DMACK is asserted. DMACK and DIOR indicates that a DMA Read event 602 is occurring. 1FX or 3FX and DIOR indicates that an I/O Read event 602 is occurring. The CAPTURE_EN signal 1310 limits the captured data to eight data transfers when the "State Mode/8 Data Transfers" capture mode 603 is selected.

The DIOW signal 1313 drives a write pulse 1314 if CAPTURE_EN 1310 is asserted and if the ATA 1FX or 3FX address 1311 is selected, or DMACK is asserted. DMACK and DIOW indicates that a DMA Write event 602 is occurring. 1FX or 3FX and DIOW indicates that an I/O Write event 602 is occurring.

Generating the IRQPULSE to perform a capture when an ATA Interrupt Request (INTRQ) occurs is different than capturing any other event because the disk drive generates the INTRQ signal. The other events are host generated, and thus the ATA INTRQ signal is asynchronous to the other events. The analyzer circuitry which generates the IRQPULSE (1315 through 1331) ensures that the pulse does not occur during another capture. If the INTRQ signal occurs during another event, the other event has the higher priority and the INTRQ event is captured after the other capture is done. A delay circuit (1326 through 1331) ensures that the IRQPULSE is not generated during another capture or within 20 ns of another capture. The XFER signal indicates that another capture is in process. A flip-flop 1322 stores the INTRQ signal until the IRQPULSE is generated. When the previous transfer has completed 1325, and an INTRQ event is waiting to be captured 1322, then the IRQPULSE write pulse is asserted by a flip-flop 1321. A delay circuit (1315 through 1320) shuts off the write pulse after 20 ns. Either an ATA Hard Reset (HRST) 1323 or an INTRQ 1324 can generate the IRQPULSE.

The CAPTURE_EN signal 1310 is used to limit the captured data to eight data transfers when the "State Mode/8 Data Transfers" capture mode 603 is selected. The CAPTURE_EN signal 1309 is normally asserted and is deasserted to halt capturing. CAPTURE_EN is deasserted when a counter 1309 counts eight consecutive DMA transfers or I/O transfers to the Data Task File register (1F0). Each count is defined as a write pulse 1303 when the 8XFERS signal 1307 is asserted. The counter is reset by any Task File register access 1301 besides the Data register (1F0), or an Interrupt Request (INTRQ) 1305.

Trigger Circuits

Figure 14:
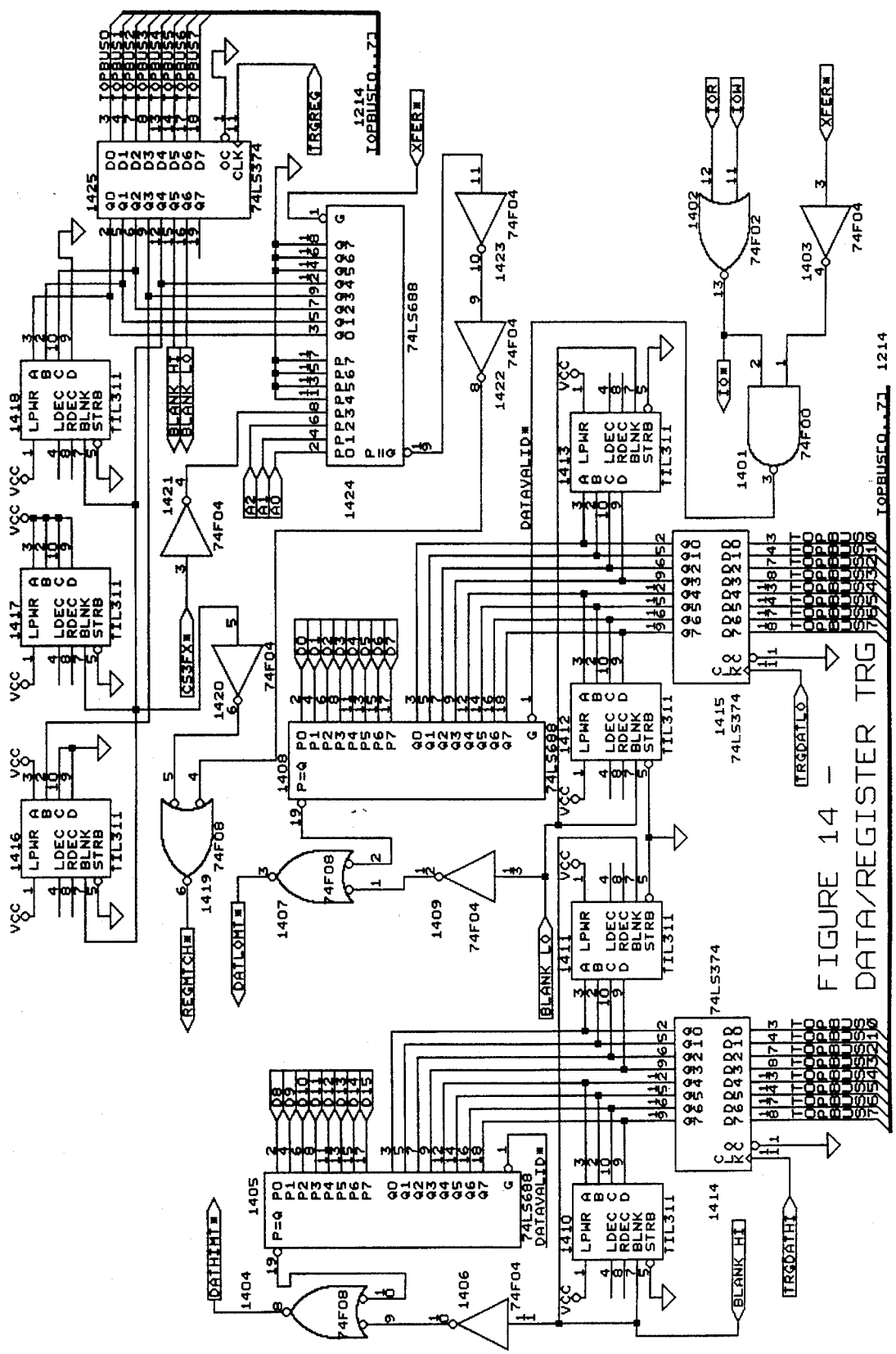
FIG. 14 is the schematic of the ATA data trigger and register trigger circuits.
Figure 15:
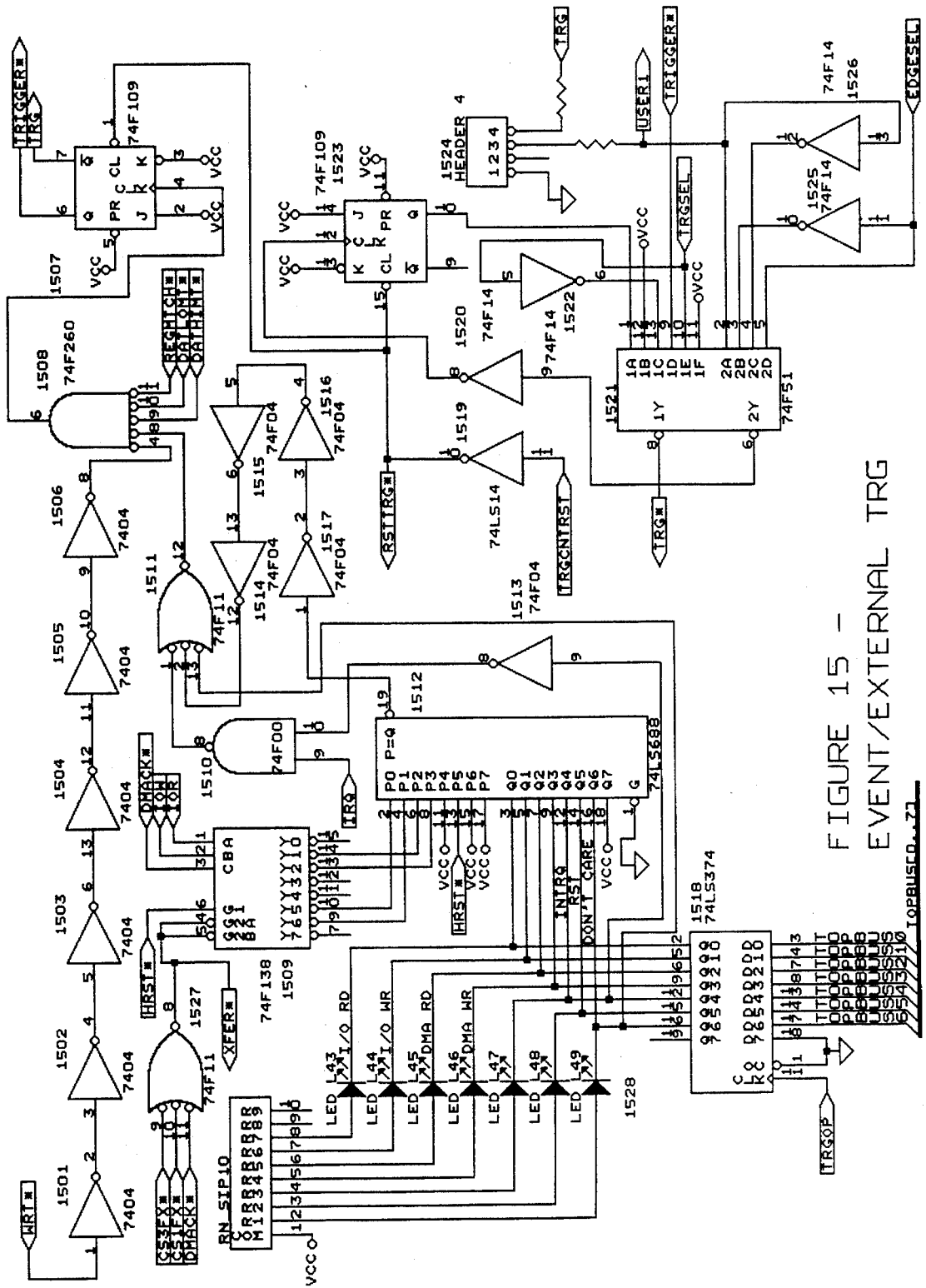
FIG. 15 is the schematic of the ATA event trigger and external trigger circuits.

FIG. 14 shows the trigger circuits for the ATA Data pattern 606 and the ATA Task File Register 605. FIG. 15 shows the trigger circuits for the ATA Event trigger 607 and the External Trigger Circuit which allows the user to trigger the analyzer on an external signal rather than the internal trigger circuits.

The internal trigger circuit recognizes a valid trigger when the three trigger comparators (Event 607, Data 606, and Register 605) simultaneously report an identical comparison. Each of the three trigger circuits can also be set to a "Don't Care" state which causes that comparator to always report an identical compare.

The Event comparator compares the user selected trigger event against the current event on the ATA bus. The user selected event is provided by the microcontroller at the TRGOP latch 1518, which also drives the trigger event LED's 1528. The current ATA event is decoded and provided for comparison by a 1-of-8 demultiplexer 1509, and a qualifier (XFER) 1527 that ensures a valid ATA address is selected. All of the events except for the INTRQ event are compared by an 8-bit comparator 1512. The INTRQ event is compared by a separate "AND" gate 1510. The results of the 8-bit comparator 1512, the "AND" gate comparator 1510, and the "Don't Care" condition are "OR"ed 1511 and passed on to be "AND"ed 1508 with the results of the Data comparators and the Register comparator. The results of the 8-bit comparator 1512 are delayed (1514 through 1517) so that the results of the compare will still be true when the Data compare signals, DATLOMT and DATHIMT 1508, are true.

The Data comparator compares the user selected trigger data against the data on the ATA bus. The user selected data is provided by the microcontroller at the TRGDATHI latch 1414, and the TRGDATLO latch 1415, which also drives the trigger data displays (1410 through 1413). The ATA data is qualified with the ATA DIOR and DIOW signals 1402 and the ATA address qualifier (XFER) 1403 to ensure that only valid data is used in the comparison. When the DATAVALID qualifier 1401 is asserted, the high data byte and low data byte comparators (1405 and 1408) are enabled.

When the ATA D0 through D7 data signals 1408 match the user selected data pattern 1415, then the DATLOMT signal 1407 is asserted. The BLANKLO signal 1409 which is driven by the TRGREG latch 1425 can also assert the DATLOMT signal 1407 when the user selects the "Don't Care" condition for the low data.

When the ATA D8 through D15 data signals 1405 match the user selected data pattern 1414, then the DATHIMT signal 1404 is asserted. The BLANKHI signal 1406 which is driven by the TRGREG latch 1425 can also assert the DATHIMT signal 1404 when the user selects the "Don't Care" condition for the high data.

The DATLOMT and DATHIMT signals are "AND"ed with the Event compare and REGMTCH signals 1508 to drive the trigger latch 1507.

The Register trigger (REGMTCH) is asserted when the ATA address signals match the user selected register address 1425 and the register is qualified as a valid transfer by the XFER signal 1527. The microcontroller provides the register address on a latch 1425. The output of the latch 1425 drives the input of the comparator 1424 as well as the hexadecimal trigger register displays (1416 through 1418). The latch 1425 also provides the signals which set the Register and Data triggers to a "Don't Care condition (1420 and BLANK_HI and BLANK___LO). The results of the 8-bit comparator 1424 are delayed (1422 and 1423) so that the results of the compare will still be true when the Data compare signals, DATLOMT and DATHIMT 1508, are true.

The REGMTCH signal 1419 is "AND"ed with the DATLOMT, DATHIMT and Event compare signals 1508 to drive the trigger latch 1507. The TRIGGER output of the trigger latch 1507 indicates that the internal trigger conditions have been met. This TRIGGER signal is an input to a trigger source selector 1521 which selects between the internal TRIGGER signal and the external USER1 signal 1524 as the source of the trigger. The external trigger input USER1 is latched 1523 in order to provide an edge sensitive trigger circuit. The user may select either the rising or falling edge of the USER1 signal to be triggered on. This selection is made using the EDGESEL signal 1525 which is provided by the dip switches 706. The dip switches also generate the TRGSEL signal 1521 which is used to select either the internal or the external trigger as the trigger source. The output of the trigger source and edge selector 1521 is used to enable the "Stop After Trigger" counter (1017 through 1020) which stops the capture after counting a preselected number of events (see the previous "Capture Stop Circuit" section).

Display Circuits

The displays which are used in stand-alone mode as shown in FIG. 1 consist of LED's, 7-segment displays, and Hexadecimal displays. The circuits for driving these displays are shown in FIG. 14, 15, 16, 17, 18, and 19.

FIG. 14 shows the hexadecimal displays used for displaying the data trigger (1410 through 1413). These displays show a hexadecimal number which corresponds to the hexadecimal data pattern the user has selected as the trigger data pattern 606. The displays are updated when the microcontroller writes the TRGDATHI and TRGDATLO latches (1414 and 1415). The microcontroller can blank the displays by setting the BLANK_HI and BLANK_LO bits of the TRGREG latch 1425.

FIG. 14 also shows the hexadecimal displays used for displaying the register trigger (1416 through 1418). These displays show a hexadecimal number which corresponds to the hexadecimal register (1F0–1F7 and 3F6 and 3F7) the user has selected as the trigger register 605. The displays are updated when the microcontroller writes the TRGREG latch 1425. The microcontroller can blank the displays by setting bit 4 of the TRGREG latch 1425.

FIG. 15 shows the LED's used for displaying the event trigger 1528. One of the 7 LED's is always lit, indicating the currently selected trigger event, or the "Don't Care" condition 607. The displays are updated when the microcontroller writes the TRGOP latch 1518.

Figure 16:
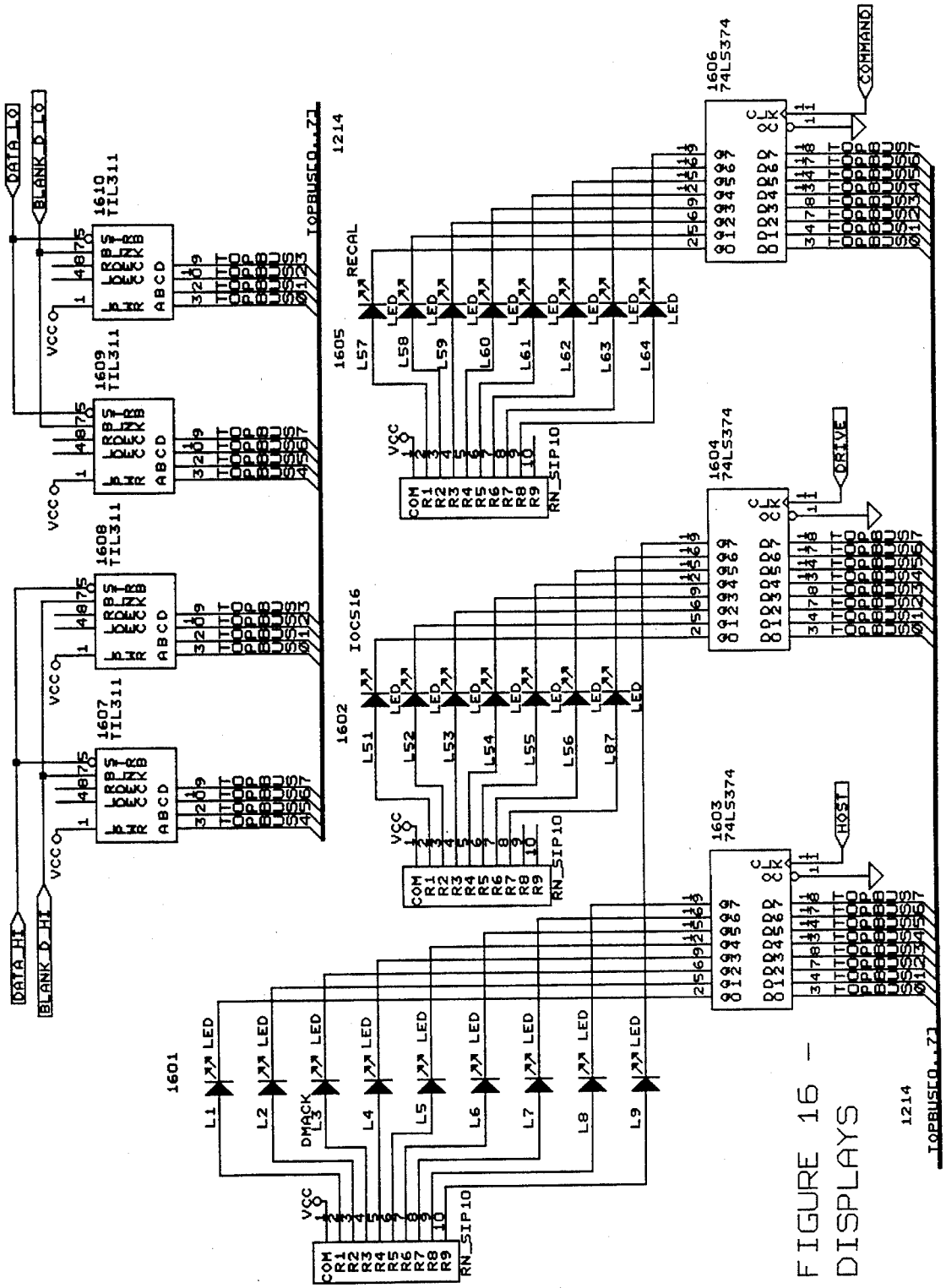
FIG. 16 is the schematic of the ATA control signal displays, data displays, and command displays.

FIG. 16 shows the LED's used for displaying the ATA Host control signals 1601, the ATA Drive control signals 1602, and the ATA Command 1605. FIG. 16 also shows the hexadecimal displays used for displaying the ATA Data signals (1607 through 1610). The ATA Host LED's 1601 are updated when the microcontroller writes the HOST latch 1603. The ATA Drive LED's 1602 are updated when the microcontroller writes the DRIVE latch 1604. The ATA Command LED's 1605 are updated when the microcontroller writes the COMMAND latch 1606. The ATA Data displays (1607 through 1610) are directly writable by the microcontroller. The microcontroller can blank the ATA Data displays for events which do not involve data such as INTRQ or Hard Reset. The high data byte is blanked when the microcontroller sets the BLANK_D_HI bit of the REGISTER2 latch 1703. The low data byte is blanked when the microcontroller sets the BLANK_D_LO bit of the REGISTER2 latch 1703.

Figure 17:
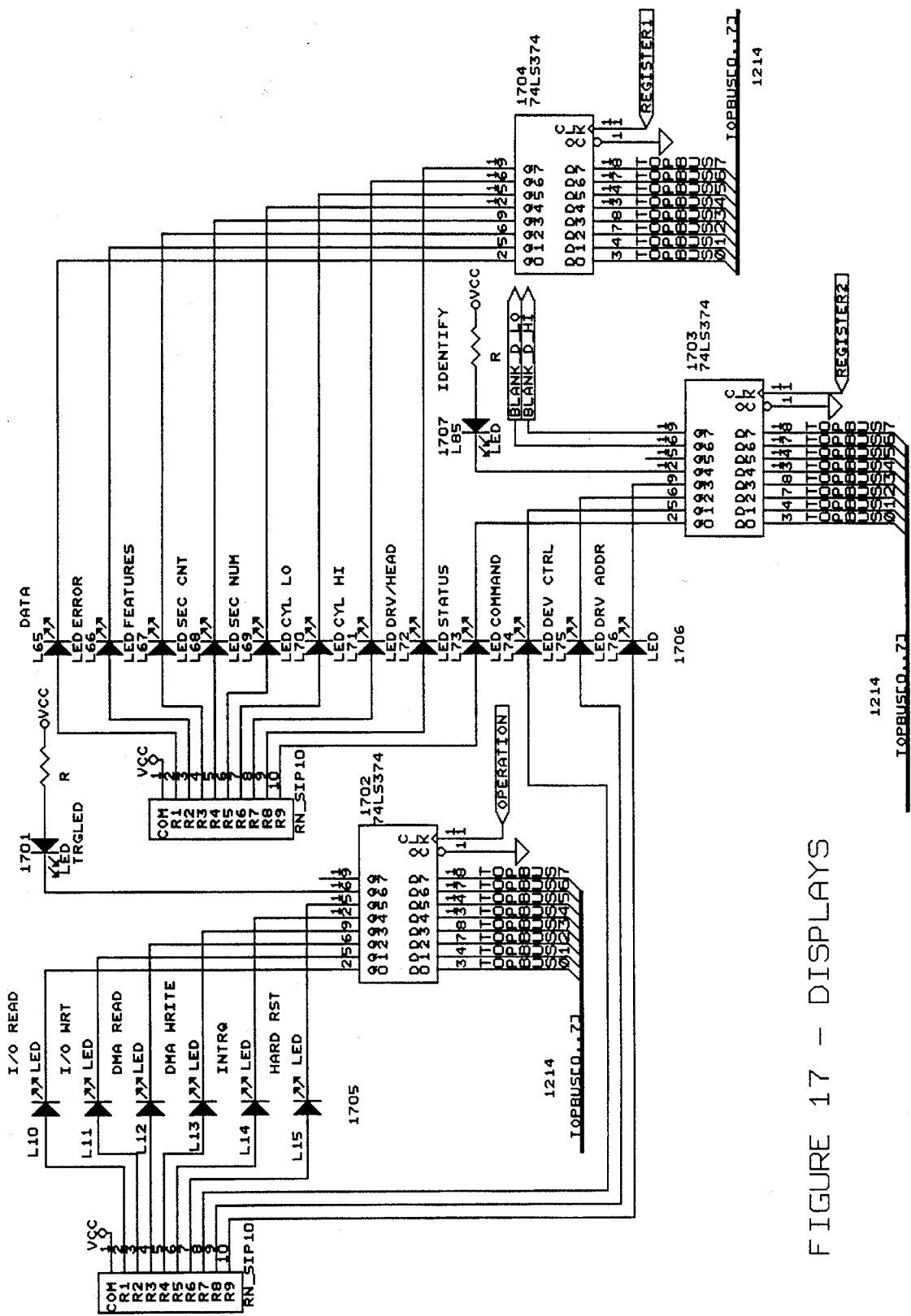
FIG. 17 is the schematic of the ATA event, register, and command displays.

FIG. 17 shows the LED's used for displaying the ATA Events 1705, the "After Trigger" indicator 1701, the ATA Register 1706, and one of the ATA Commands 1707. The ATA Event LED's 1705 and the "After Trigger" LED are updated when the microcontroller writes the OPERATION latch 1702. The Task File Register LED's 1706 are updated when the microcontroller writes the REGISTER1 latch 1704, and the REGISTER2 latch 1703. The additional ATA Command LED 1707 is also updated when the microcontroller writes the REGISTER2 latch 1703.

Figure 18:
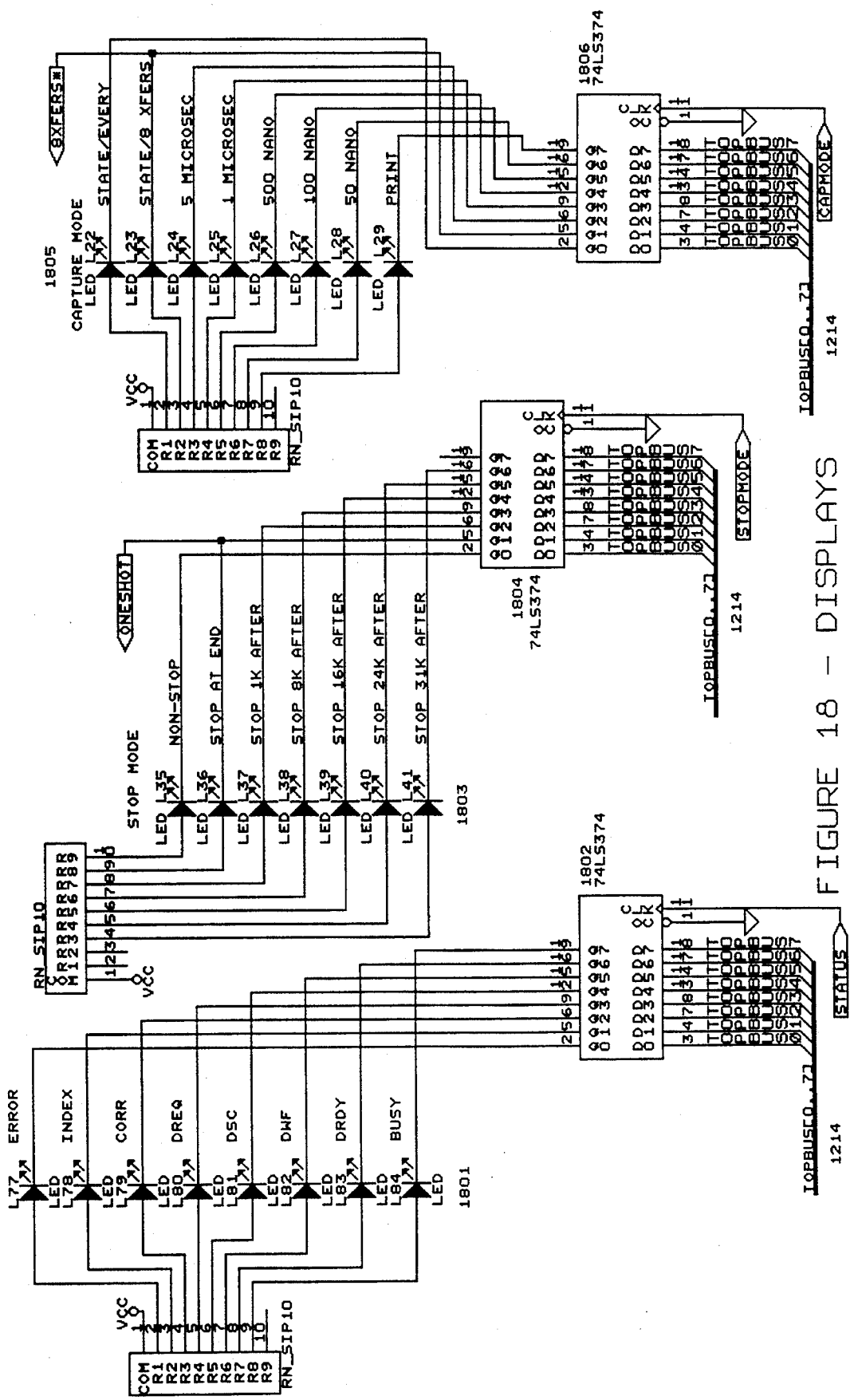
FIG. 18 is the schematic of the ATA status register display, and stop mode display and capture mode display.

FIG. 18 shows the LED's used for displaying the ATA Status Register 1801, the Stop Mode 1803, and the Capture Mode 1805. The ATA Status Register LED's 1801 are updated when the microcontroller writes the STATUS latch 1802. The Stop Mode LED's 1803 are updated when the microcontroller writes the STOPMODE latch 1804. The Capture Mode LED's 1805 are updated when the microcontroller writes the CAPMODE latch 1806.

Figure 19:
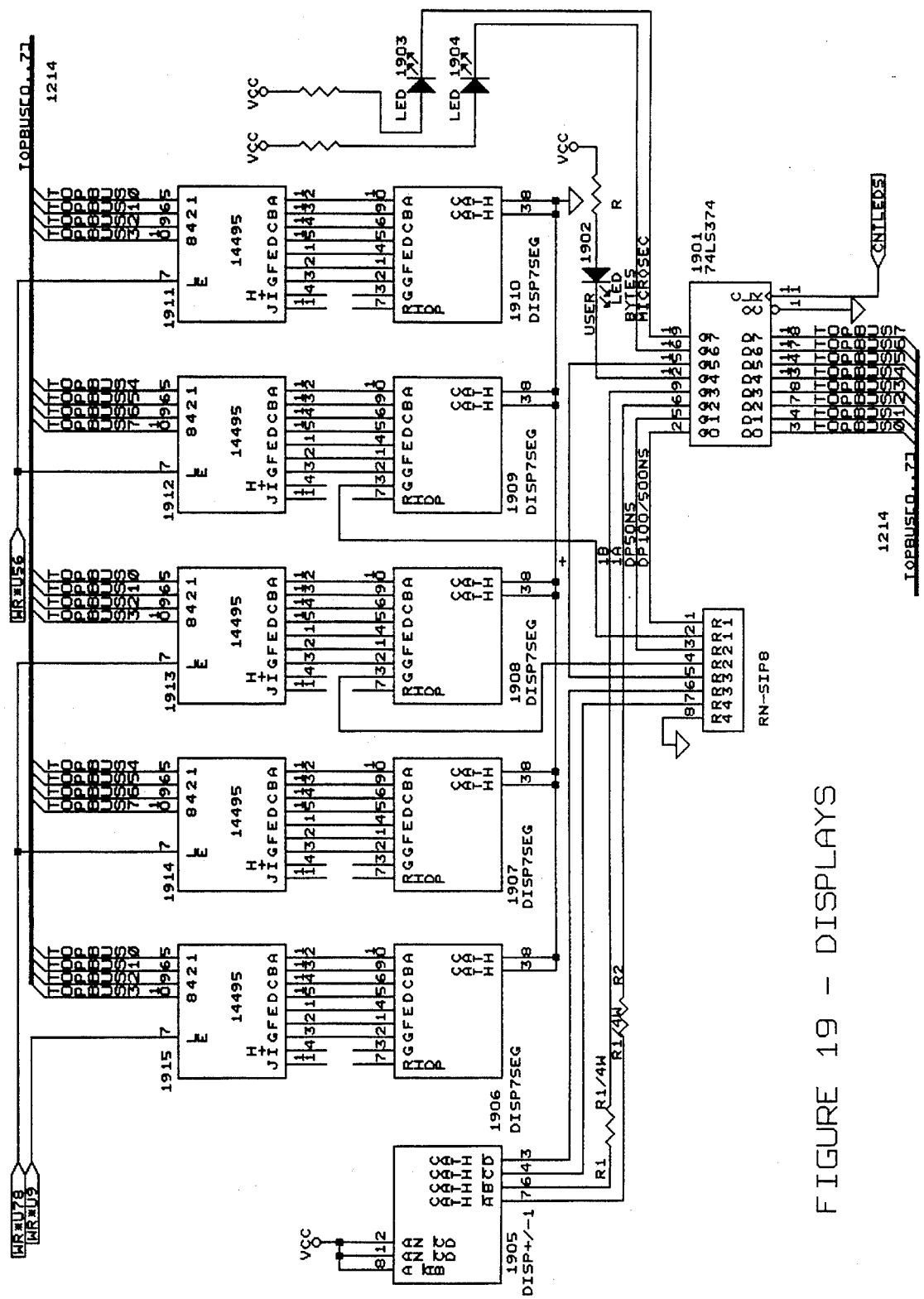
FIG. 19 is the schematic of the event and timing counter displays.

FIG. 19 shows the 7-segment counter 609 displays, the BYTES LED 1904, and the MICROSEC LED 1903. The counter display consists of five full digits (1906 through 1910), plus an additional digit 1905 capable of displaying a "1" only. The five full digits are each driven by a display driver which interlaces directly to the microcontroller bus. The fifth and most significant digit 1906 is updated when the microcontroller writes four bits to its display driver 1915. The fourth and third digits are updated when the microcontroller writes eight bits (4 bits to each) to both display drivers (1914 and 1913). The second and first digits (least significant) are updated when the microcontroller writes eight bits (4 bits to each) to both display drivers (1912 and 1911).

The microcontroller updates the BYTES LED 1904, the MICROSEC LED 1903, the USER LED 1902, the right hand decimal points (1908 and 1909) and the "+/−1" display 1905 by writing to the CNTLEDS latch 1901.

Firmware

The functions of the ATA analyzer circuitry have been described in detail. As the previous sections indicate, many of the analyzers function are implemented in the microcontrollers firmware. The firmware itself is not discussed here because one reasonably skilled in the art of programming should be able to write the necessary firmware based on the description of the hardware that has been given.

While the preferred embodiment and various alternative embodiments of the invention has been disclosed and described in detail herein, it will be obvious to those skilled in the art that various changes in form and detail may be made therein without departing from the spirit and scope thereof.

I claim:

1. An apparatus for recording and interpreting the interface signals on the Advanced Technology Attachment (ATA) interface or Integrated Drive Electronics (IDE) interface or substantially similar interface comprising:

(a) a recording means for recording said interface signals;

(b) an interpreting means for interpreting said interface signals into their higher level categories of event type, register or address, and data value;

(c) a communicating means for communicating information between said apparatus and a computer or human user;

(d) a trigger comparison means for generating a trigger signal when said interface signals match a predetermined trigger pattern;

(e) a control circuit for starting/stopping said recording means relative to said trigger signal;

(f) a trigger selection means for user selection of the trigger pattern in said categories of event type, register or address, and data value, and translating the user selection into said trigger pattern to be used by said trigger comparison means, whereby a user may select a valid trigger pattern without a knowledge of the function of each of said interface signals;

(g) a trigger mask means for masking portions of said interface signals from said trigger comparison means, whereby interface signals or certain of said categories or options within said categories may be ignored.

2. The apparatus of claim 1 wherein said trigger selection means is automatically modified, after each user selection, to remove or disable certain of said categories or options within said categories which are not normally associated with other options the user has previously selected, whereby invalid or non-occurring trigger patterns are prevented, and said trigger selection means is simplified.

3. The apparatus of claim 1 wherein said trigger selection means warns the user if the user selects said categories or options within said categories which are not normally associated with other options the user has previously selected, whereby invalid or non-occurring trigger patterns can be avoided.

4. An apparatus for recording and interpreting the interface signals on the Advanced Technology Attachment (ATA) interface or Integrated Drive Electronics (IDE) interface or substantially similar interface comprising:

(a) a recording means for recording said interface signals;

(b) an interpreting means for interpreting said interface signals into their higher level categories of event type, register or address, and data value;

(c) a communicating means for communicating information between said apparatus and a computer or human user;

(d) a trigger comparison means for generating a trigger signal when said interface signals match a predetermined trigger pattern;

(e) a control circuit for starting/stopping said recording means relative to said trigger signal;

(f) an event recognition means which only enables said recording means when an event which is significant to the user occurs on said interface signals;

(g) an event prioritizing means working in conjunction with said event recognition means which causes said recording means to store a higher priority event first, and afterward store the lower priority event(s), whereby multiple events occurring simultaneously on said interface signals are correctly recorded.

* * * * *

UNITED STATES PATENT AND TRADEMARK OFFICE
CERTIFICATE OF CORRECTION

PATENT NO.   : 5,457,694
DATED        : October 10, 1995
INVENTOR(S)  : Dale T. Smith It is certified that error appears in the above-indentified patent and that said Letters Patent is hereby corrected as shown below:

On the title page item [76], change "Dale J. Smith" to "Dale T. Smith".

Col. 1, line 12, change "interlace" to "interface".

Col. 2, line 25, change "prior an" to "prior art".

Col. 4, line 60, change "be stared when" to "be started when".

Col. 17, line 60, change "interlaces" to "interfaces".

Signed and Sealed this

Twenty-sixth Day of December, 1995

Attest:

BRUCE LEHMAN

*Attesting Officer*    *Commissioner of Patents and Trademarks*